United States Patent
Wang et al.

(10) Patent No.: US 11,122,439 B2
(45) Date of Patent: Sep. 14, 2021

(54) NETWORK SLICING OPERATION

(71) Applicant: IDAC HOLDINGS, INC., Wilmington, DE (US)

(72) Inventors: Guanzhou Wang, Brossard (CA); Mahmoud Watfa, Saint Leonard (CA); Saad Ahmad, Montreal (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/077,684

(22) PCT Filed: Feb. 16, 2017

(86) PCT No.: PCT/US2017/018147
§ 371 (c)(1),
(2) Date: Aug. 13, 2018

(87) PCT Pub. No.: WO2017/143047
PCT Pub. Date: Aug. 24, 2017

(65) Prior Publication Data
US 2019/0037409 A1    Jan. 31, 2019

Related U.S. Application Data

(63) Continuation of application No. PCT/US2017/018147, filed on Feb. 16, 2017.
(Continued)

(51) Int. Cl.
*H04W 16/04*  (2009.01)
*H04W 8/08*   (2009.01)
(Continued)

(52) U.S. Cl.
CPC ............. *H04W 16/04* (2013.01); *H04W 8/08* (2013.01); *H04W 28/06* (2013.01); *H04W 48/18* (2013.01); *H04W 88/14* (2013.01); *H04W 12/06* (2013.01)

(58) Field of Classification Search
None
See application file for complete search history.

(56) References Cited

U.S. PATENT DOCUMENTS

2014/0086177 A1    3/2014  Adjakple et al.
2016/0156513 A1    6/2016  Zhang et al.
(Continued)

FOREIGN PATENT DOCUMENTS

WO      2015/178033 A1    11/2015
WO      2015-178035 A1    11/2015
WO   WO 2016/162480 A1    10/2016

OTHER PUBLICATIONS

3rd Generation Partnership Project (3GPP), S2-163338, "Solution for Selection of a Network Slice Instance", Ericsson, Sa WG2 Meeting #116, Vienna, AT, Jul. 11-15, 2016, pp. 1-4.
(Continued)

*Primary Examiner* — Adnan Baig
(74) *Attorney, Agent, or Firm* — Condo Roccia Koptiw LLP

(57) ABSTRACT

A network control node (Main CTRL or CTRL N) may receive a service request by a WTRU, wherein the service information comprises one or more of a service class, a quality of service (QoS) requirement, or a mobility characteristic. The network control node may determine slice information associated with a plurality of network slices and may select at least a first network slice to serve the WTRU. The network control node may determine whether the network control node or another network control node should service the WTRU for accessing the first network slice.
(Continued)

When the network control node determines that the another network control node should service the WTRU for accessing the first network slice, the network control node may send a request to the another network control node that indicates that the another network control node should service the WTRU for accessing the first network slice.

20 Claims, 12 Drawing Sheets

Related U.S. Application Data

(60) Provisional application No. 62/306,738, filed on Mar. 11, 2016, provisional application No. 62/296,030, filed on Feb. 16, 2016.

(51) Int. Cl.
*H04W 28/06* (2009.01)
*H04W 48/18* (2009.01)
*H04W 88/14* (2009.01)
*H04W 12/06* (2021.01)

(56) References Cited

U.S. PATENT DOCUMENTS

| | | | |
|---|---|---|---|
| 2017/0201922 A1 | 7/2017 | Akiyoshi | |
| 2018/0242161 A1* | 8/2018 | Vulgarakis Feljan | ...................... H04W 16/10 |
| 2018/0352501 A1* | 12/2018 | Zhang | ................... H04W 48/14 |
| 2019/0037531 A1* | 1/2019 | Pantus | ................... H04W 68/00 |
| 2019/0045351 A1* | 2/2019 | Zee | ....................... H04W 48/18 |

OTHER PUBLICATIONS

3rd Generation Partnership Project (3GPP), TR 22.891 V1.2.0, "Technical Specification Group Services and System Aspects, Feasibility Study on New Services and Markets Technology Enablers, Stage 1 (Release 14)", Nov. 2015, 96 pages.
3rd Generation Partnership Project (3GPP), TR 23.799 V0.2.0, "Technical Specification Group Services and System Aspects, Study on Architecture for Next Generation System (Release 14)", Feb. 2016, 17 pages.
Bozakov et al., "AutoSlice: Automated and Scalable Slicing for Software-Defined Networks", Context Student Workshop, ACM, Nice, France, Dec. 10, 2012, pp. 3-4.
Hattachi et al., "NGMN 5G White Paper", Version 1.0, Feb. 17, 2015, 125 pages.
KT Corporation, "Network Slicing Based 5G Service", Available at http://www.slideshare.net/Netmanias/201606ktnetwork-slicing-based-5-g-services , Jun. 21, 2016, pp. 1-11.
NGMN Alliance, "Description of Network Slicing Concept", NGMN 5G P1; Requirements & Architecture; Work Stream End-to-End Architecture, Version:1, Jan. 13, 2016, pp. 1-7.
Rabie, Karim, "Network Slicing—Why Would You Slice the Network?!", Available at: https://www.linkedin.com/pulse/network-slicing-why-would-you-slice-karim-rabie , Jun. 20, 2016, pp. 1-7.
Shimojo et al., "Future Core Network for the 5G Era", Availabe at https://www.nttdocomo.co.jp/english/binary/pdf/corporate/technology/rd/technical_journal/bn/vol17_4/vol17_4_006en.pdf, NTT Docomo Techinal Journal, vol. 17, No. 4, 2016, pp. 50-59.
Shimojo et al., "Future Mobile Core Network for Efficient Service Operation", Proceedings of the 2015 1st IEEE Conference on Network Softwarization, Apr. 2015, 6 pages.
3rd Generation Partnership Project, S1-152074, "Update the Network Slicing Use Case in Smarter", ZTE Corporation, 3GPP TSG-SA WG1 Meeting #71, Belgrade, Serbia, Aug. 17-21, 2015, 3 pages.
Li et al., "End-to-End Network Slicing in 5g Wreless Communication Systems", ETSI Workshop on Future Radio Technologies—Air Interface, Sophia Antipolis, France, Jan. 27-28, 2016, pp. 1-4.
Shimojo et al., "Future Core Network for the 5G Era", NTT DoCoMo Technical Journal, The Telecommunications Association, vol. 23, No. 4, Jan. 2016, 11 pages.
3rd Generation Partnership Project (3GPP), TR 33.899 V0.5.0, "Technical Specification Group Services and System Aspects, Study on the Security Aspects of the Next Generation System (Release 14)", Oct. 2016, pp. 1-244.
3rd Generation Partnership Project (3GPP), TR 38.801 V0.3.0, Technical Specification Group Radio Access Network, Study on New Radio Access Technology, Radio Access Architecture and Interfaces (Release 14), Aug. 2016, pp. 1-20.

\* cited by examiner

NETWORK SLICING OPERATION

CROSS-REFERENCE TO RELATED APPLICATIONS

This application is the National Stage entry under 35 U.S.C. § 371 of Patent Cooperation Treaty Application PCT/US2017/018147, filed Feb. 16, 2017, which claims the benefit of U.S. Provisional Application Nos. 62/296,030 filed on Feb. 16, 2016, and 62/306,738 filed on Mar. 11, 2016, the disclosures of which are incorporated herein by reference as if fully set forth.

BACKGROUND

The types of use cases in a 5G network are expected to be diverse and one more of the use cases may be associated with relatively extreme and/or inflexible service requirements. In order to support many diverse use cases that have differing requirements within a (e.g., 3GPP) cellular communication network, network slices (e.g., a 5G slice) may be defined to support, for example, communication services of a particular connection type. The network slice may comprise a collection of one or more network functions (e.g., 5G network functions) and/or one or more radio access technology (RAT) settings than can be used to provide service for a given application. The use of network slicing may allow the 5G network architecture to be more flexible and/or scalable.

Previous core network architectures utilized a relatively monolithic network and transport framework. Such a framework was relatively limited in terms of providing differentiated service to different wireless transmit/receive units (WTRUs). Although the use of network slicing may allow for network flexibility, such a scheme allowed for relatively uniform procedures and systems in terms of need for assigning network resources to a WTRU. The introduction of 5G network slicing may create numerous potential issues related to discovering which network slices are being provided by the operator, selecting network slices for one or more WTRU, and/or connecting to a particular network slice.

SUMMARY

Systems, methods, and instrumentalities are provided for a network control node for connecting a wireless transmit/receive unit (WTRU) to a network slice in a network. The network control node may receive service information associated with a service being requested by the WTRU, wherein the service information comprises one or more of a service class, a quality of service (QoS) requirement, or a mobility characteristic. The network control node may determine slice information associated with a plurality of network slices, wherein the slice information comprises one or more of an identifier of the network slice, priority of the network slice, a service class served by the network slice, a target device class, a QoS target, mobility support, security service, charging information, and/or performance information. The network control node may determine subscriber information for the WTRU. The network control node may select at least a first network slice of the plurality of network slices to serve the WTRU, wherein the network control node selects the first network slice based on the service information, the slice information associated with the first network slice, and the subscriber information for the WTRU. The network control node may determine whether the network control node or another network control node should service the WTRU for accessing the first network slice. On condition that the network control node determines that the network control node should service the WTRU for accessing the first network slice, the network control node may provide at least one network service associated with the first network slice to the WTRU. Or, on condition that the network control node determines that the another network control node should service the WTRU for accessing the first network slice, the network control node may send a request to the another network control node that indicates that the another network control node should service the WTRU for accessing the first network slice.

DETAILED DESCRIPTION

Figure 1:
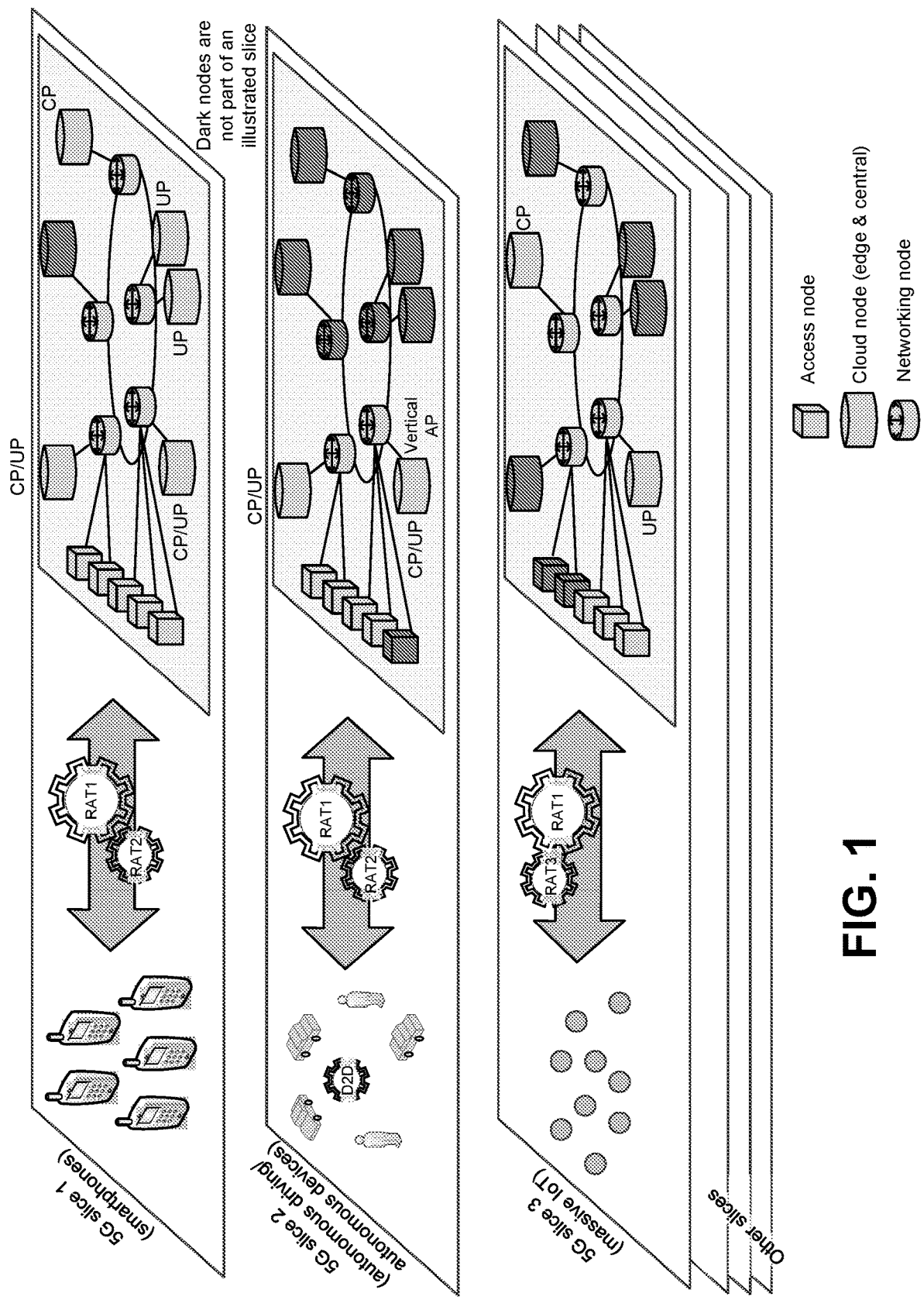
FIG. 1 depicts a diagram illustrating example network slices implemented on a same infrastructure (e.g., by employing various RATs and/or combinations of nodes).

A detailed description of illustrative embodiments will now be described with reference to the various Figures. Although this description provides a detailed example of possible implementations, it should be noted that the details are intended to be exemplary and in no way limit the scope of the application.

3GPP is in the process of designing the next generation core network to cater to future 5G requirements. Example requirements may include control plane/user place (CP/UP) separation, access agnostic services, integration of cross-domain networks, and introduction of technology enablers such as Network-function virtualization (NFV), SDN and network slicing.

NFV is a network architecture concept that may use the technologies of IT virtualization to virtualize entire classes of network node functions into building blocks that may connect, or chain together, to create communication services.

NFV relies upon, but differs from, traditional server-virtualization techniques, such as those used in enterprise IT. A virtualized network function (VNF), may include one or more virtual machines running different software and processes on top of standard high-volume servers, switches and storage, or even cloud computing infrastructure, rather than or in addition to having custom hardware appliances for each network function.

An example NFV framework may include three components: virtualized network functions (VNFs), network function virtualization infrastructure (NFVI), and network functions virtualization management and orchestration architectural framework (NFV-MANO Architectural Framework). For example, VNFs may be software-based implementations of network functions that may be deployed on one or more NFVI. The NFVI may correspond to the hardware and software components used to build the environment where VNFs are deployed. For example, the NFV infrastructure may span several locations, and the network providing connectivity between these locations may be regarded as part of the NFV infrastructure. NFV-MANO Architectural Framework may correspond to the collection of functional blocks, data repositories used by the functional blocks, and reference points and interfaces through which these functional blocks exchange information for the purpose of managing and orchestrating NFVI and VNFs.

The building block for both the NFVI and the NFV-MANO may be the NFV platform. In the NFVI role, the NFV platform may include virtual and physical processing and storage resources, and virtualization software. In its NFV-MANO role, the NFV platform may include VNF and NFVI managers and virtualization software operating on a hardware controller. The NFV platform may implement carrier-grade features used to manage and monitor the platform components, recover from failures and provide effective security (which may be required for a public carrier network).

Software-defined networking (SDN) is an approach to computer networking that may allow network administrators to manage network services through abstraction of higher-level functionality. This may be done by decoupling the system that makes decisions about where traffic may be sent (the control plane) from the underlying systems that forward traffic to the selected destination (the data plane).

SDN allows creation of an architecture that may be dynamic, manageable, cost-effective, and adaptable, suitable for the high-bandwidth and dynamic nature of today's applications. SDN architecture may decouple network control and forwarding functions, enabling network control to become directly programmable and the underlying infrastructure to be abstracted from applications and network services.

SDN architecture may include one or more of the following features in any combination. For example, an SDN architecture may be directly programmable (e.g., network control may be directly programmable because it may be decoupled from forwarding functions). An SDN architecture may be agile (e.g., abstracting control from forwarding may let administrators dynamically adjust network-wide traffic flow to meet changing needs). SDN architecture may be centrally managed (e.g., network intelligence may be (logically) centralized in software-based SDN controllers that maintain a global view of the network, which may appear to applications and policy engines as a single, logical switch. SDN architecture may be programmatically configured relatively quickly, which may allow network managers to configure, manage, secure, and optimize network resources via dynamic and/or automated SDN programs. SDN architecture may be open standards-based and/or vendor-neutral.

When implemented through open standards, SDN may simplify network design and operation because instructions may be provided by SDN controllers instead of multiple, vendor-specific devices and protocols.

A network slice (e.g., a 5G slice) may span some one or more or all domains of a given network, including, for example, software modules running on cloud nodes, specific configurations of the transport network that support flexible location of functions, a dedicated radio configuration, a specific radio access technology (RAT), configuration of a network device (e.g., a 5G device), and/or the like. Different network slices may contain the same or different functions. Some functions for a mobile network may not be included in some of the network slices while other functions may be included in all network slices provided by a given network. The network slices may be designed to provide traffic treatment for a use case. For example, some network slices may be targeted to support massive broadband (e.g., high-speed, high bandwidth applications), others may be designed to support massive machine-type communications (e.g., Internet-of-Things (IoT) use cases), while still others may support ultra-reliable low-latency communications (e.g., for critical infrastructure communications). The network slices may be designed to share some or all underlying network resources while being relatively functionally independent for service of different WTRUs using the different use cases. The network slices may be designed to avoid unnecessary functionalities. The slice concept may be flexible and may enable the expansion of existing businesses and/or the creation of new businesses, for example. Third-party entities may be given permission to control certain aspects of slicing, e.g., via a suitable application program interface (API). Tailored services may be provided.

Methods and apparatus associated with network slicing operations are provided. For example, a WTRU and/or one or more network nodes may be configured to discover one or more network slices for use by the WTRU. For example, information broadcasted by a radio access network (RAN) may facilitate network slice selection. The information may include identifiers for the network slices, priorities of the network slices, service classes served by the network slices, and/or the like. When multiple network slices are discovered that serve different target user groups and/or services, the methods may be used by a WTRU and/or one or more network nodes to select an appropriate network slice to serve the WTRU. The selection may be made by the WTRU autonomously, may be made by one or more network nodes, and/or may involve a selection procedure involving both the WTRU and/or one or more network nodes. The selection may be made on a per-WTRU basis and/or on a per-service basis. A WTRU may utilize multiple network slices, for example for different types of services.

FIG. 1 illustrates an example in which multiple 5G slices may be operated (e.g., concurrently operated) on the same network infrastructure. As an example and for purposes of illustration, a 5G slice supporting a certain smartphone use case may be realized by distributing functions (e.g., CP functions and/or UP functions) to multiple nodes across the network. Concurrently, a 5G slice supporting automotive (e.g., autonomous vehicle) use cases may emphasize security, reliability, and/or latency requirements. For such a slice, functions (e.g., all of the necessary and/or potentially dedicated functions) may be instantiated at the cloud edge node, for example to allow performance targets to be met. Vertical applications may be included, for example, due to latency constraints. To allow on-boarding of such vertical applications on a cloud node, sufficient open interfaces may be defined. For a 5G slice supporting massive machine type devices (e.g., sensors, IoT, etc.), basic C-plane functions may be configured, for example, with contention-based resources for the access. One or more mobility functions may be omitted, for example where it is known that a given device is relatively stationary. Other dedicated slices may be operating in parallel. A generic slice providing basic connectivity (e.g., best-effort connectivity) may be used, for example, to cope with unknown use cases and/or traffic. Irrespective of the slices supported by the network (e.g., a 5G network), the network may contain functionality for controlling and/or securing the operation of the network, e.g., from end-to-end and/or at any circumstance.

Dedicated infrastructure resources may be used for certain slices. Infrastructure resources and functions may be shared among multiple slices. An example of a shared function may be a radio scheduler. The scheduler of a RAT may be shared among multiple slices. For example, the scheduler may play a role in allocating resources and/or setting the performance of a network slice (e.g., a 5G slice). The role may include determining the extent to which consistent user experience may be realized. The scheduler implementation of a network may be proprietary, but a level of openness may be defined, for example, to exercise sufficient control over the scheduler's functions in order to meet scheduling requirements for a given network slice.

In an example system architecture (e.g., a 5G system architecture), the C- and U-plane functions (control plane- and user-plane functions, respectively) may be separated. Open interfaces may be defined between the C- and U-plane functions, for example, in accordance with SDN principles. Open interfaces may be defined between access-specific and access-agnostic functions so that additional access technologies (e.g., fixed/wired and/or radio) may be integrated into the network. The fronthaul interface(s) between remote radio units and baseband units may be open and/or flexible. Multi-vendor operation and/or forward and backward compatibility may be offered. Options for transport bandwidth reduction may be provided. The interfacing between functions may allow for multi-vendor provisioning of different functions.

To support such a flexible and open architecture, the granularity at which functions are defined may be considered in system architecture design. Finer granularity may improve flexibility, but may lead to additional network complexity and/or load. For example, testing efforts for different function combinations and/or slice implementations may become cumbersome and functional interworking issues among different networks may arise. A granularity level that balances the goals of flexibility with complexity may be identified. The granularity level may influence how the eco-system delivers solutions.

Network slice operation may be made transparent or visible to end users/devices. The devices may be configured to discover what network slices are being provided by the operator (e.g., in the devices' current location and/or radio access network). In an example, network slices may encompass core network functions, underlying resources, radio access resources, and/or the like. A radio access network may belong to various network slices. In such a situation, knowledge about the network slices may enable a wireless transmit/receive unit (WTRU) to select an appropriate radio access technology (RAT) or radio access network (RAN) for a target network slice. In another example, a serving network slice may be subject to dynamic changes according to certain criteria, such as a device's mobility state. The device may initiate the changes, for example, since the mobility state information may be available at the device side (e.g., more conveniently available to the device compared to other network components). In an example, the network may select one or more network slice on behalf of the WTRU based on information stored about the WTRU (e.g., subscription information, capability information, etc.) and/or based on information provided by a WTRU (e.g., mobility information, service information, etc.).

A 5G system or next generation core network architecture may allow a third party application server (AS) to access information regarding services provided by the network (e.g., connectivity information, quality of service (QoS), mobility, power saving etc.) and to dynamically customize the network capability for different diverse use cases. The core network may provide such exchange of network capabilities to the third party service provider via the API or the service capability exposure function (SCEF) in the core network. If network configuration and connectivity information is exchanged, the AS may request a particular network slice or provide information to assist the core network to make a decision to select a particular slice. Methods may be defined for such application server triggered or assisted selection of a core network slice.

A WTRU may operate in different modes when discovering network slices, as illustrated by the following examples. The WTRU may operate in an early discovery mode. In this mode, the WTRU may discover available or supported network slices before it accesses or connects to a radio access network. In an example, a RAN may belong to one or more network slices but not all available network slices. The WTRU may decide whether to access this RAN or select another RAN based on discovered network slices that are supported by the RAN. The WTRU may employ one or more of the following methods for discovering the network slices.

For example, the RAN may broadcast information associated with available network slices that the RAN belongs to or is connected to. The RAN may broadcast the information using air interface signaling (e.g., such as system information and/or beacon message). The network slice information for a particular network slice may include one or more of the following example fields or parameters: an identifier of the network slice, priority of the network slice, service class(es) served by the network slice, target device class, QoS targets, mobility support, security service, charging information, and/or performance information.

The WTRU and/or network node may utilize the network slice information parameters in order to select an appropriate slice for the WTRU. The device performing slice selection for a WTRU (e.g., one or more network nodes, the WTRU, a combination of one or more network nodes and the WTRU, etc.) may utilize some or all of the examples of network slice information parameters in order to perform slice selection. Various combinations may be used and the identity of the set of parameters utilized for selection of a given slice may be based on the service, the identity of the WTRU, network capabilities, etc. The selecting device (e.g., network node and/or WTRU) may ensure that the values for the network slice information parameters are sufficient (or are supported at all) to support the expected services to be used by the WTRU over that network slice.

An example of a network slice information parameter that may be utilized for network slice selection may include the network slice identifier. The network slice identifier may be unique (e.g., globally unique or unique in an operator's network). Where the slice identifier is unique in an operator's network, the combination of the network ID (e.g., such as a Public Land Mobile Network or PLMN ID) and the network slice identifier may uniquely identify a network slice. The slice identifiers broadcasted for discovery purposes may be the same as or different from the slice identifiers used in core network slice operations. For example, the broadcasted network slice identifiers may be human-readable texts, while the identifiers used in the slice operations may be L2 network identifiers such as Multiprotocol Label Switching (MPLS) labels or virtual LAN (VLAN) IDs.

An example of a network slice information parameter that may be utilized for network slice selection may include a slice priority. An available network slice may be assigned a selection priority. In an example, the WTRU may not have a particular target network slice. The WTRU may follow a priority order in selecting network slices. For example, the highest priority network slice may be considered as a default network slice. Other network slice information, such as slice identifier or service class, may be associated with a certain priority. The presence of those information (e.g., the slice identifier and/or service class) may indicate the priority and explicit priority information may not be necessary.

An example of a network slice information parameter that may be utilized for network slice selection may include a service class. A service class may indicate the target service type and/or user group that a network slice is intended to serve. The service class may indicate the general performance parameters (e.g., such as delay, throughput, service continuity, security, etc.) of the network slice. An example list of service classes may include the following: mission critical service, general broadcast service, delay tolerant service, and/or high mobility service. In an example, a network slice may support multiple service classes so the broadcasted slice information may include more than one service class.

An example of a network slice information parameter that may be utilized for network slice selection may include an association with certain types of WTRUs. A network slice may be deployed to serve a specific target group of WTRUs (e.g., not all WTRUs). For example, a mission critical service may be accessible only to WTRUs that belong to an emergency service group (e.g., such as police, fire brigade, medical aids, etc.). The WTRUs may be preconfigured to be associated with a certain access class. A network slice (e.g., each network slice) may indicate a range of device access classes that are allowed to access the network slice.

An example of a network slice information parameter that may be utilized for network slice selection may include one or more QoS metrics. QoS metrics (e.g., minimum or maximum delay, minimum or maximum throughput) may be indicated. For example, the QoS metrics may reflect what a network slice promises to achieve. Such metrics may be used by mission critical devices (e.g., devices with stringent QoS requirements).

An example of a network slice information parameter that may be utilized for network slice selection may include an indication of support for types of mobility management mechanisms. Different network slices may employ different mobility management mechanisms. Details of the mobility management mechanism may be indicated via mobility support information. For example, one or more of the following may be indicated in the mobility support information: the supported mobility protocol (e.g., GTP, PMIP, DSMIP, etc.), whether IP address preservation may be supported, whether service continuity (with or without IP address preservation) may be supported, whether distributed mobility may be supported, and/or the like.

An example of a network slice information parameter that may be utilized for network slice selection may include a security mechanism. Different network slice may employ different security mechanisms. The mobility support information may indicate the details of the security mechanism. Charging rate related information may be indicated for a network slice (e.g., each network slice). Performance related information such as the load percentage, congestion status, and/or the like, may be indicated.

A WTRU may acquire the broadcast network slice information, for example if the WTRU is performing or assisting with network slice selection. For example, the WTRU may acquire the information from air interface signaling (e.g., such as system information or beacon messages). The WTRU may store the acquired network slice information in its memory. The WTRU may pass the acquired slice information to higher layers, for example, to decide whether to choose a particular network slice. The acquired network slice information may be presented to the user via a user interface.

A WTRU may serve as a relay node and provide communication relay services to the other WTRUs. For example, the WTRU may serve as a relay WTRU for proximity services (ProSe) and/or for device to device (D2D) communication. A WTRU may serve as a relay for a Road Side Unit (RSU) in a vehicular communication system. The WTRU may broadcast the network slice information of the slice the WTRU is currently served by or belongs to. The broadcast may prompt other WTRUs (e.g., remote WTRUs) to choose the relay WTRU for desired services. For example, the broadcast may be sent over a D2D/ProSe interface such as the PC5 interface.

A WTRU may receive network slice information from a network server (e.g., using Web APIs such as XML-based APIs or JSON). The network service may identify available network slices and/or may provide network slice information parameters for one or more slices (e.g., slice identifier, service classes, etc.). The slice information provided by the network server may be organized in different ways. In an example, the slice information may be organized based on the geographical locations in which the slices are available (e.g., such as an RAN IDs, cell IDs, various area IDs, network IDs, GPS coordinates, etc.). In an example, the slice information may be organized based on the time periods in which the slices are available (e.g., "always", "8:00 am-10:00 am each day", "every Saturday", etc.). In an example, the slice information may be organized based on the radio access technologies or networks of the slices (e.g., LTE access, WLAN access, etc.).

Detailed network slice information may be preconfigured in a non-volatile memory (e.g., of a WTRU). Slice identifiers may be used as indices to the preconfigured information. In such cases, the network may provide the network slice identifier(s) that are available. The WTRU may use the slice identifier(s) provided by the network to retrieve the corresponding slice information that has been stored. The preconfigured network slice information in the WTRU may be subject to modification by the network (e.g., using Over the Air (OTA) methods).

For example, after the WTRU has selected and connected to a RAN, the WTRU's initial network message, such as Attach or location area update or PDN connectivity request, may be directed to a network function/entity that has the knowledge of the available network slices through that RAN. Such a network function may be the mobility management control function or the network slice selection function. The WTRU may provide the connected RAN ID, the RAT of the connected RAN, selected PLMN, desired services or other information related to network slice selection in the initial network messages. The network function that receives the message may either select an appropriate network slice for the WTRU or it will return the available network slice information to the WTRU in a response message.

The network function that provides the network slice information may be independent from any network slices, or it may belong to a default network slice that handles the WTRU's initial network messages if no other network slice has been selected for the WTRU. Each RAN may be able to direct the WTRU's initial network messages to this network function, for example if no other specific network slice is indicated in the WTRU's message. The received network slice information may be used by the WTRU to autonomously select the network slice, or may be presented to the user via the user interface for further human intervened network slice selection.

Figure 2:
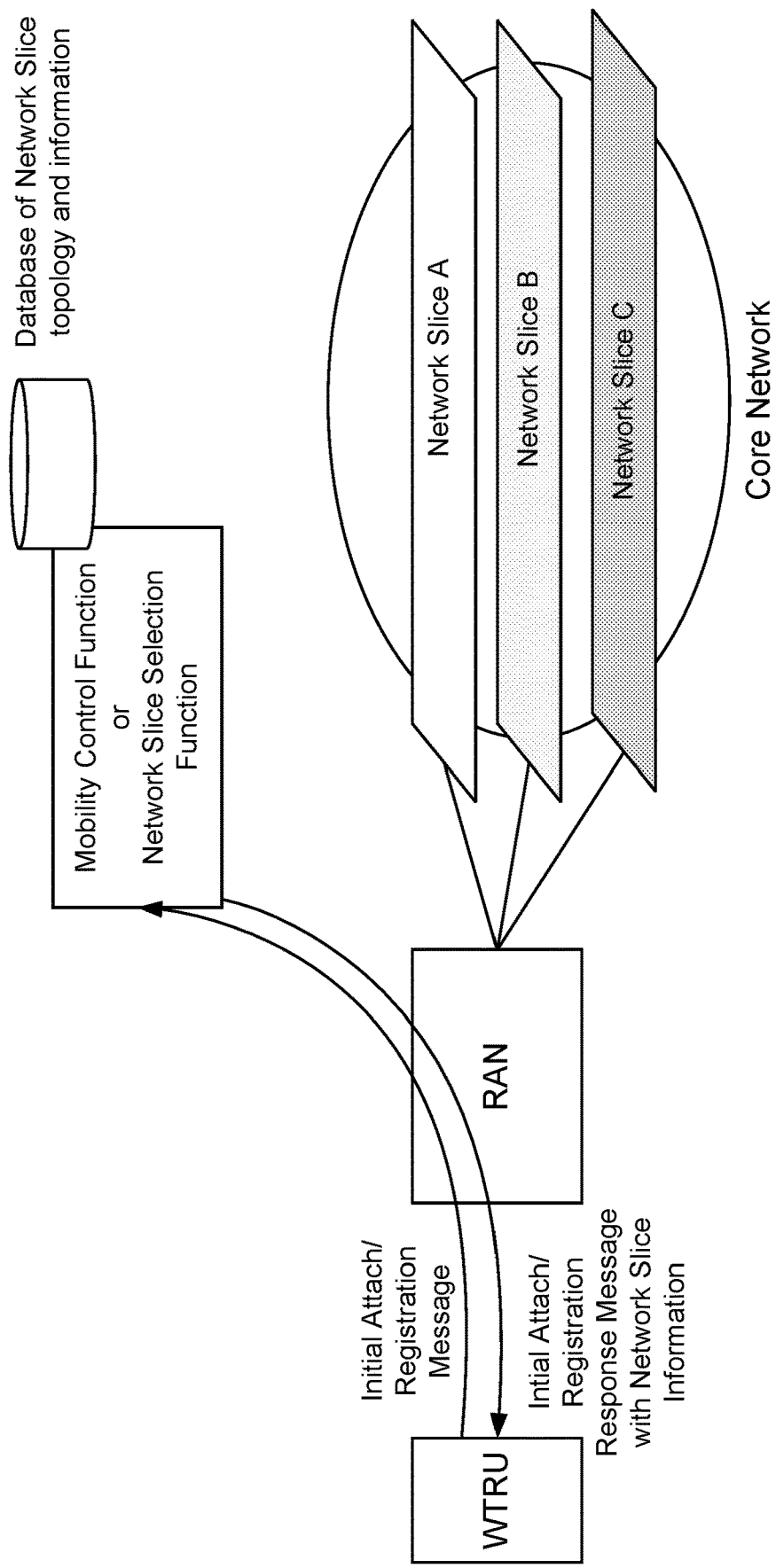
FIG. 2 depicts a diagram illustrating network slice information being provided by the network when a wireless transmit/receive unit (WTRU) initially attaches or registers with the network.

FIG. 2 is a diagram illustrating example network slice information being provided by the network when the WTRU (or UE) initially attaches or registers with the network.

The WTRU may initially select or connect to a network slice, such as the default network slice. The WTRU may requests further information of the other available slice information. The WTRU may use the (further) information to reselect the network slice for current or future services. The additional network slice information may be provided by the RAN, the mobility control function, or the network slice selection function, etc. The WTRU's request may be directly sent to a network-slice-independent centralized control function/database and the requested information may be provided by that function/database; or the request may be sent to some control function in its currently connected network slice and forwarded from there to a centralized control function, such as a common network slice selection function. Similarly the WTRU may provide information related to network slice selection in the request.

Figure 3:
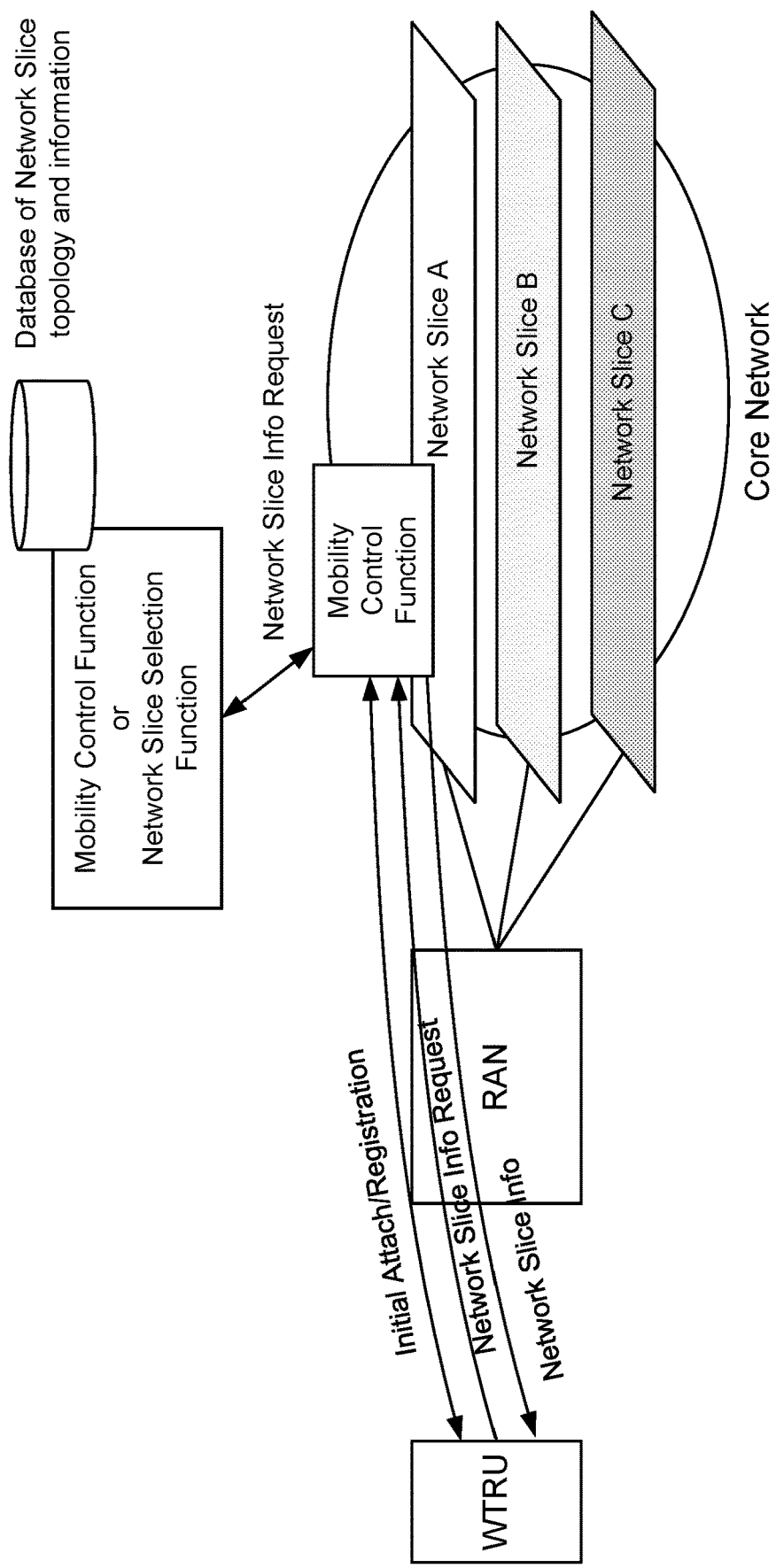
FIG. 3 depicts a diagram illustrating network slice information retrieval upon request, e.g., after initial connection to a network slice.

FIG. 3 is a diagram illustrating network slice information retrieval after initial connection to a network slice.

Other network slice discovery modes may be possible. For example, a late discovery mode may be used. In this mode, a WTRU may discover available or supported network slices after the WTRU has selected and connected to a RAN. A transparent mode may be used. In this mode, the network may choose (e.g., arbitrarily choose) a suitable serving network slice for a WTRU (e.g., the WTRU may not conduct slice discovery). The network slice operation may be transparent to the WTRU. The WTRU may provide information, such as its service class, QoS requirements, mobility characteristics, etc., to help the network choose the slice.

When a network supports network slicing and multiple network slices are deployed (e.g., to serve different target user groups and/or services), a WTRU may select (or be served by) a network slice, for example, based on the WTRU's services and/or characteristics. For example, the WTRU may connect to a network slice that is optimized for the WTRU's services and/or characteristics. In an example, both the WTRU and the network may participate in network slice selection, and an agreement may be reached between the WTRU and the network with respect to the selection. In an example, a WTRU connects to multiple network slices simultaneously for its various applications.

Figure 4A:
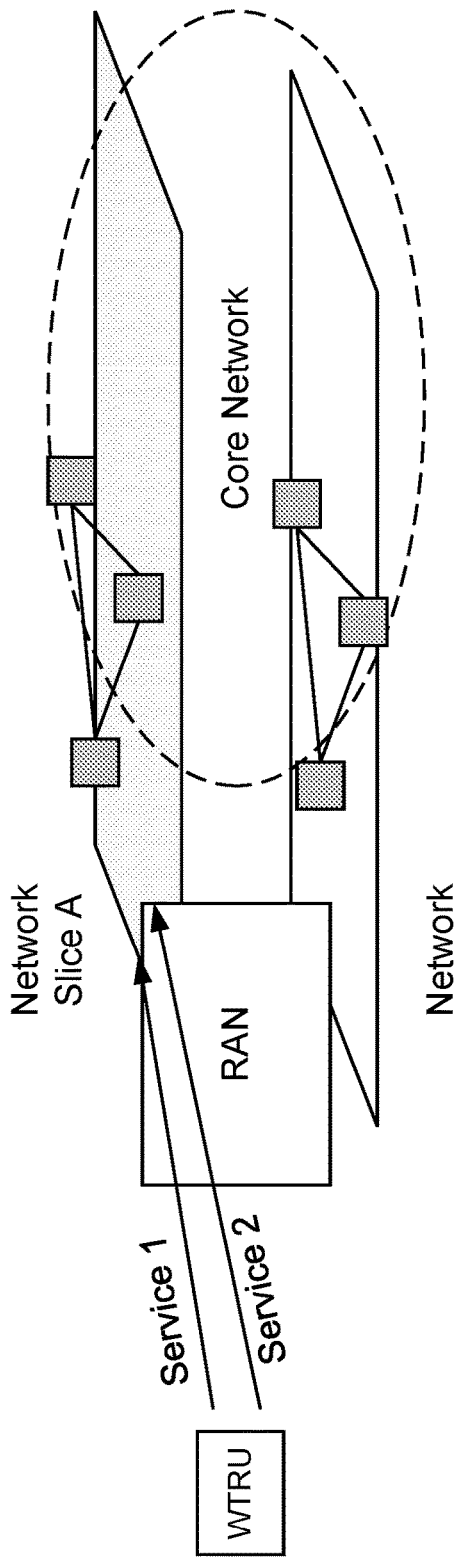
FIG. 4A depicts a diagram illustrating an example network slice selection made on a per-WTRU basis.
Figure 4B:
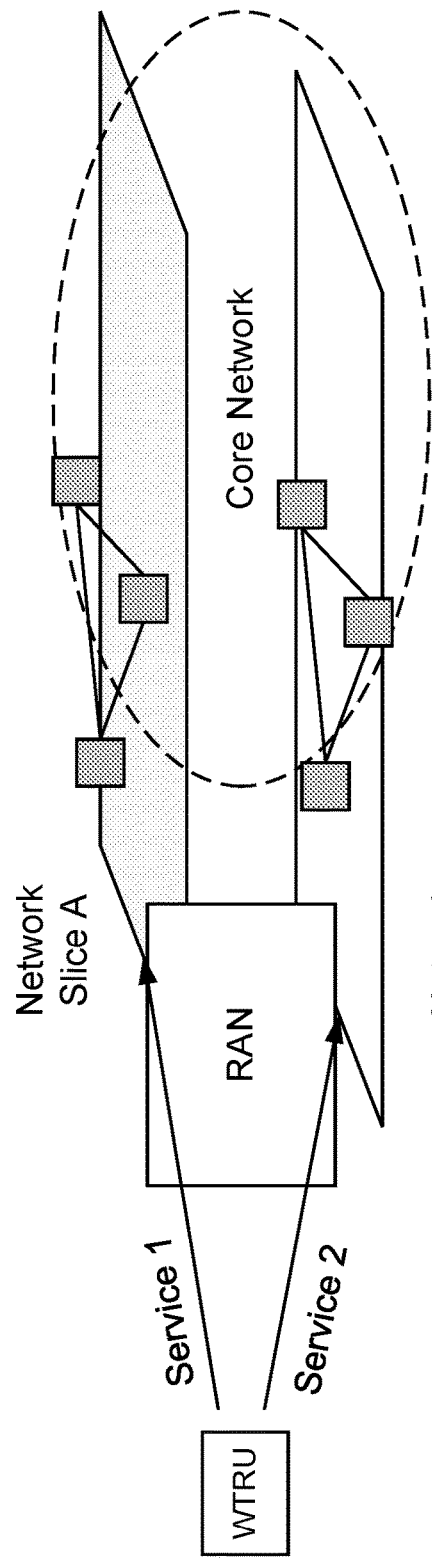
FIG. 4B depicts a diagram illustrating an example network slice selection made on a per-service basis.

FIGS. 4A and 4B illustrate example network slice selection methods. As shown in FIG. 4A, network slice selection may be conducted on a per-WTRU basis. In an example per-WTRU selection implementation, the WTRU may connect to a network slice and all the services and/or applications running on the WTRU may be served by the selected network slice.

Network slice selection may be conducted on a per-service basis, as shown in FIG. 4B. In an example per-service selection implementation, the WTRU may choose different network slices for different services and/or applications. The WTRU may be served by multiple network slice instances at the same time.

A WTRU may be configured to select one or more network slices autonomously. In an example, the WTRU may autonomously select the network slice(s) by matching the WTRU's pre-configured designated or target serving network slices against discovered available network slices. The WTRU may be preconfigured with target or preferred network slice(s). For example, the WTRU may be configured with a list of preferred or target network slice identifiers and/or an order of selection priority in the WTRU's non-volatile memory. The WTRU may discover one or more available network slice instances. The WTRU may search in its configured list of preferred network slices to determine whether any of those slices are available. The WTRU may select the highest priority slice that is available. The WTRU may be configured with other relevant information such as, for example, one or more of the following: the service class(es) that the WTRU belongs to, the mobility mechanisms that the WTRU supports and/or prefers, the security mechanisms that the WTRU supports and/or prefers, the QoS targets, and/or the like. The WTRU may use one or more pieces of the information described herein to match the preconfigured/target network slices with the discovered network slice information, and choose the serving network slice accordingly. In an example, the network (e.g., a node of the network) may obtain the one or more pieces of the information described herein (e.g., the service class(es) that the WTRU belongs to, the mobility mechanisms that the WTRU supports and/or prefers, the security mechanisms that the WTRU supports and/or prefers, the QoS targets, and/or the like) to use for choosing a suitable serving network slice for the WTRU.

The WTRU may have a set of configurations (e.g., such as those described herein) for a Home Network. The WTRU may have a set of configurations (e.g., such as those described herein) for a Visiting Network. The WTRU may have the configurations on a per-service basis. The WTRU may have the configurations on a per-Session basis. The WTRU may select different network slices for various services or sessions. The WTRU may simultaneously select multiple network slices if those services/sessions are run at the same time. The WTRU may be configured to have a default or fallback network slice. The WTRU may fall back to select the default network slice, for example, when the WTRU's preferred network slices are not available. The default network slice may be configured on a per-service basis or a per-network operator basis, for example.

A WTRU may receive network slice selection policies from the network. For example, the network slice selection policy may describe what network slices may be selected under certain conditions/criteria. For example, the selection policy may be based on one or more of the following conditions: geographical locations, which may specify what specific network slice(s) may be selected in a specific geographical area and which may be identified by RAN IDs, cell IDs, various area IDs, network IDs, GPS coordinates, and/or the like; access technologies, which may specify what specific network slice(s) may be selected if the WTRU employs a specific radio access technology such as LTE or WLAN; services, which may specify what network slices may be selected for specific services (e.g., if multiple services are running on the WTRU, multiple network slices may be selected according to the policy); and/or mobility level, which may indicate that the WTRU may select slice A when in low mobility and select slice B when in high mobility.

After the WTRU selects (e.g., autonomously selects) one or more network slices, the WTRU may indicate the selection result. In an example, the indication may include targeted network slice identifiers in the WTRU-Network signaling (e.g., such as initial Attach, PDN connectivity request, etc.). In an example, discovered network slices may be presented to the user, e.g., via user interfaces, and the user may manually select the desired network slices. Results of the user selection may be passed to relevant radio access modules and/or other high-layer modules. The WTRU may make slice selection recommendations to the user. The user may select the slices on a per service basis and may thus select multiple slices at the same time.

The network may be configured to control the selection of network slices. For example, the network may be configured to select one or more network slices for a WTRU (e.g., the WTRU may be assigned multiple network slices and may have simultaneous access to these slices).

Figure 5:
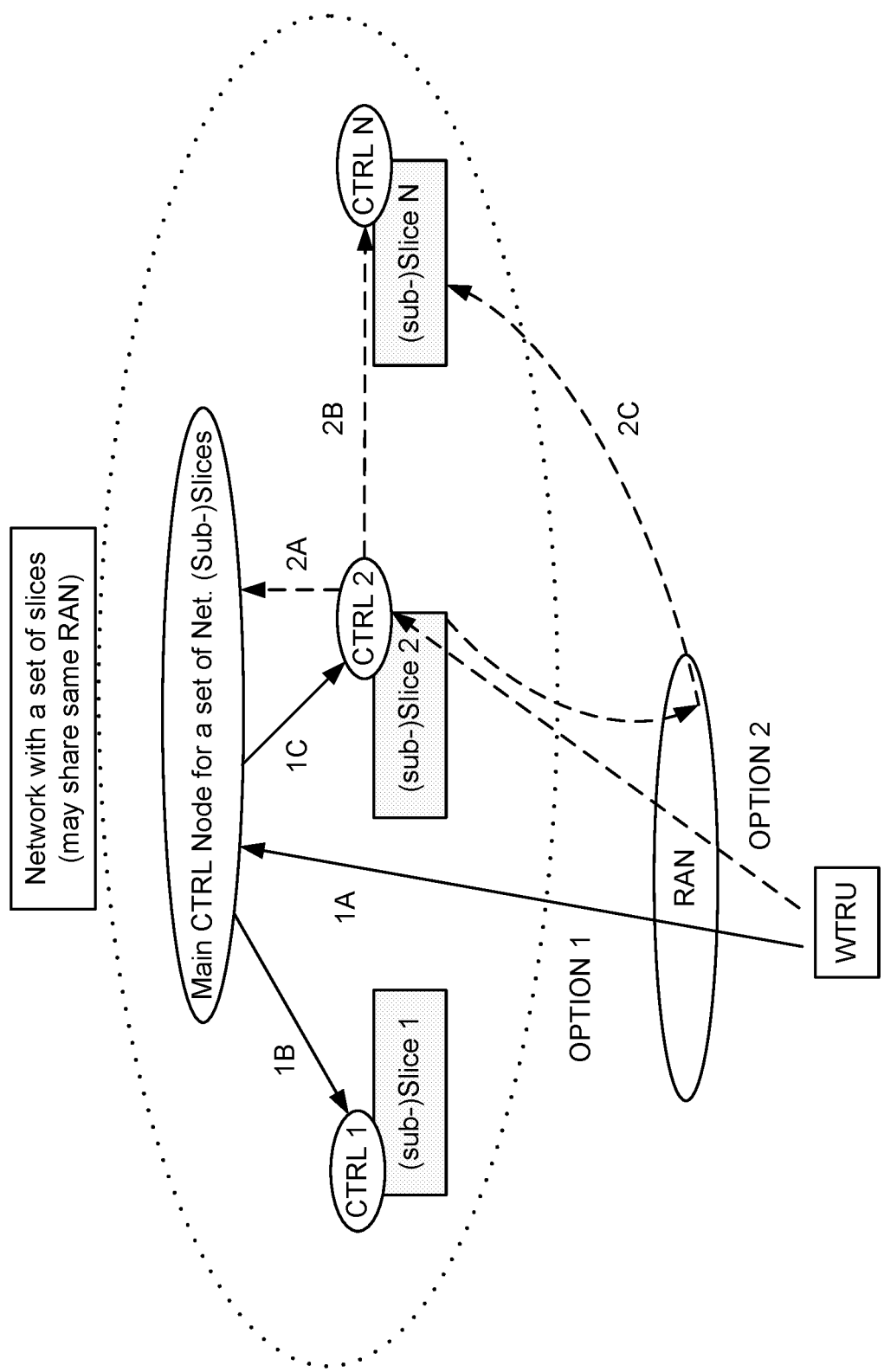
FIG. 5 depicts a diagram illustrating an example network-controlled slice selection.

FIG. 5 illustrates example network-controlled slice selection. Multiple techniques may be used for assigning a WTRU to at least one network slice. The term "slice" used herein may refer to a complete network slice or a sub-network slice.

In an example, a main control node may be used to perform slice selection among a set of network slices. This main control node may receive a message from a higher layer (e.g., a Non-Access Stratum (NAS) message or an equivalent thereof, which may be referred to herein as a NAS message). The main control node may process the message to determine which slice is to be assigned for the WTRU. The main control node may utilize one or more network slice information parameters in order to select a network slice. The main control node may utilize information provided by the WTRU for selecting a network slice. For example, the WTRU may indicate services that the WTRU wants to use and the main control node may utilize the provided service information to select a slice. The main control node may utilize subscription information for the WTRU to select a slice. The main control node may use local policy information to select a network slice.

In an example, the WTRU may send a NAS message for its initial registration to the system. When sending the first NAS message to register (e.g., when the WTRU has not registered before), the WTRU may indicate in the radio layer (e.g., via a RRC message) that the NAS message or the connection established is for registering the WTRU for the first time. In an example, the WTRU may indicate that it has not been assigned a network slice. Based on the indication, the RAN may send a NAS message to the main control node and the NAS message may include a set of information related to the services that the WTRU desires to get. Once the NAS message gets to the main control node (e.g., shown as 1A in FIG. 5), the node may use the information comprised in the NAS message and/or other information (e.g., local policy information, subscriber information, etc.) to determine the set of network slices (and/or the addresses of these nodes) that may be assigned to the WTRU. For example, the main control node may use the provided service information from the WTRU to select the network slice that has appropriate network slice information parameters in order to provide the service on behalf of the WTRU.

Upon making the determination, the main control node may take one or more of the following example actions. The main control node may contact one or more network slices that may serve the WTRU (e.g., based on services requested by the WTRU). The main control node may forward the NAS message as received from the WTRU. The main control node may forward a sub-set of the NAS message, e.g., to include information related to the service type that the slice can offer but not include other information unrelated to the service(s) that can be provided by the network slice. The main control node may forward a new NAS message. The main control mode may send another type (e.g., a different protocol type) of message, e.g., based on the interface that exists between the main control node and the control entity nodes in the slices. The main control node may include service information, e.g., service information allowed for the WTRU (e.g., as shown as 1B and 1C).

In an example, the WTRU may be allowed to get service from a single slice. In those cases, the main control node may contact a control entity of the selected slice. Further, although FIG. 5 shows just two network slices (e.g., pointed by 1B and 1C), more network slices may be contacted or assigned by the main control node. The main control node may send subscriber information for the relevant WTRU. The main control node may send a response NAS message to the WTRU, e.g., to acknowledge the receipt of the NAS message. The main control mode may inform the WTRU (e.g., via the response message) about the number of slices that have been assigned for the WTRU. The main control mode may inform the WTRU (e.g., via the response message) that the network slices are processing the WTRU's request(s).

A control entity in a network slice may receive a request to serve a WTRU. For example, the control entity may receive a NAS message or another message from a main control node. The control entity may verify whether it may serve the WTRU based on information comprised in the message (e.g., service related information from the WTRU) and/or other information (e.g., subscriber information, local policies, etc.). Once the control entity determines that it may serve the WTRU, the control entity may send a NAS message to the WTRU and indicate that the WTRU is registered for a particular set of services. The network slice that comprises the control entity (e.g., the control entity in the slice) may provide the WTRU with an identity and/or address that points to the particular network slice.

There may be a main control node for network selection and/or the slice control/network nodes may not have a "main" or "master" node. the RAN may forward a NAS message to a control entity within a network slice (e.g., any network slice), using the RAN's normal methods for selecting a core network. Once the NAS message reaches a control entity of the network slice for the core network connection selected by the RAN, the control entity may verify whether it may serve the WTRU for some or all of the required services. The verification may be made based on information included in the NAS message and/or other information (e.g., subscriber information, local policies, etc.). If the control entity determines that one or more of its supported slices can serve the WTRU service and that control entity is able to serve the WTRU for all of the services, the control entity may process the NAS message and respond to the WTRU. If the control entity determines that it may not serve the WTRU and/or that at least one service should be served by a network slice associated with a different control entity, then the control entity may take one or more the following actions. The control entity may forward the NAS message to the main control node (e.g., as shown in 2A). The control entity may send the NAS message to another network slice (e.g., as shown in 2B). The control entity may use the (Enhanced) Dedicated Core Network Selection (eDECOR) method to forward the NAS message to another network slice (e.g., as shown in 2C). The control entity may be configured with information regarding which other slices may serve the WTRU (e.g., the addresses of those slices or the control entities of those slices).

If the control entity determines that it may serve part of the WTRU's required services, the control entity may process the NAS message for the services that it may offer. In an example, for the services that the control entity is unable to and/or determines not to serve, the control entity may forward the NAS message to other network slices. The control entity may also forward a new NAS message to the other network slices. The new NAS message may include information about the services that may be provided for the WTRU by the other slices. The control entity may forward the message (e.g., existing or new) directly (e.g., as shown in 2B) or using eDECOR (e.g., as shown in 2C). In an example, for the services that a particular network slice may not offer, the network slice (or the control entity of that slice) may forward the message to the main control node (e.g., as shown in 2A). The main control node may take any of the actions described herein.

An Application Server (AS) may trigger or may assist slice selection. For example, a third party AS may request a new network slice or may provide certain application level criteria or characteristics which may assist the network in making slice selection decision. The AS may communicate with the network directly, for example, via an API exposed through an exposure functions, or via an application client in the WTRU. The AS may send information to the WTRU via application level signaling. Information may be passed on the network via WTRU to network signaling protocol. For example, an application running on the WTRU may indicate service information to network signaling layers (e.g., NAS, RRC, etc.) which may send the service information to the network control node for slice selection. When described herein, the AS providing information to assist in slice selection should be understood to refer to both the AS providing the information directly to the network node (e.g., via an API, via an SCEF, without WTRU involvement, etc.) and/or via the WTRU (e.g., the WTRU application layer providing lower layers the service information which deliver the information to the network node via a RAN). One or more of the following information may be to the network to assist the selection of a network slice (e.g., via the WTRU and/or to the network backend from the AS): application QoS requirements; type of application; and/or frequency of sending application data.

In an example of application QoS requirements, the AS may send application level QoS requirements to the network for slice selection purposes. The QoS requirement may include the level of application priority. The AS may (e.g., may also) include the user priority within the application. Other QoS parameters may be included e.g. required bit rate, type of expected flows (voice, video, etc.).

In an example of type of application, there may be various types of applications running on the WTRU. The network slice decision may be made based on the category of the application. These categories may include machine type applications or internet of things (IoT) applications, health care applications, emergency or public safety applications etc. The application type or category may be determined by the application ID, or the AS may explicitly indicate the application type in the API request to the exposure layer or the network.

In an example of frequency of sending application data, the third party AS may indicate the expected data rate for a particular application to the network. This may in the form sending expected time intervals when the data is being sent or average amount data in a given amount of time (e.g., average data (bits) to be sent within an hour or within one day). Such information may also be on to passed the network for slice selection purposes as described herein.

The third party AS may play a role in slice selection in multitudes of capacities. For example, the AS may assist the network slice selection node in the network while making the initial decision (referred to herein as early discovery) to assign one or more network slices to the WTRU. The network may request the AS to provide the information to make the appropriate slice assignment decision. The AS may provide the information which may be taken an as input by the network to make the final selection. The network node may obtain the application information from various application servers and may make the final decision of the assigning one or more network slices to the WTRU after taking into consideration the application specific information from multiple application servers. The network may assign one or more network slices which best serve the need of these AS's, for example, in the case of multiple application servers providing slice selection assistance information. The network may be able to contact application servers based on Application ID's or other application information provided to the network in the initial service template by the WTRU.

The network may expose slice selection or a similar service to the third party AS. Certain API's may be available to AS to be able to request a particular slice (or, for example, at least which enable the AS to inform the network that the current network slice does not meet the application requirements, or that the AS is not satisfied with the services provided by the current network slice). The AS may initiate an API request if accessing the service via the exposure function or may send a request directly to the network (e.g., if there is a direct interface between the AS and the network to request a new network slice). The AS may include the application parameters in the request to the network. The network may make a new slice decision, for example, based on the received request from the AS. The network decision may also take into account the requirements from the other application server's transmitting data to the WTRU. The network may accept or reject the request from the AS to assign a new network slice to the WTRU. If the request is accepted, the new slice information may be communicated to the WTRU. The network may inform the WTRU directly via WTRU to network. The network may inform the AS that the API request has been accepted. The AS may inform the WTRU via the application level signaling about new slice(s) that need to be selected by the WTRU. This procedure may be used in "late discovery." The information sent to the WTRU to be able connect to the appropriate slice(s) may include one or more of the following: slice information; PLMN or Network ID; and/or time/occasion to disconnect.

In an example of Slice information (e.g., Slice id number, slice name), multiple slice information (id number, name, etc.) may be provided for the case where the WTRU is required to connect to multiple network slices.

In an example of PLMN or Network ID, the home or the serving network may be unable to meet the WTRU/application requirement, so the WTRU may be asked to connect to network slice of a roaming partner.

In an example of the time or the occasion when the WTRU should disconnect from the current serving slice and attach/connect to the new slice, it may be immediately or the WTRU may be told to change network slices when the WTRU goes to idle mode or when the next time it has data to be sent for a particular application. The WTRU may be given a time (e.g., in seconds or minutes) after which the WTRU should disconnect/detach from the current network and send a request to connect/attach to the new slice.

The third party AS may be charged by the network to use the slice selection services. There may be different levels of charging based on the type of request. A request that an application is not satisfied with the current slice may be charged differently from an explicit request that the application server may prefer a new network slice.

Figure 6:
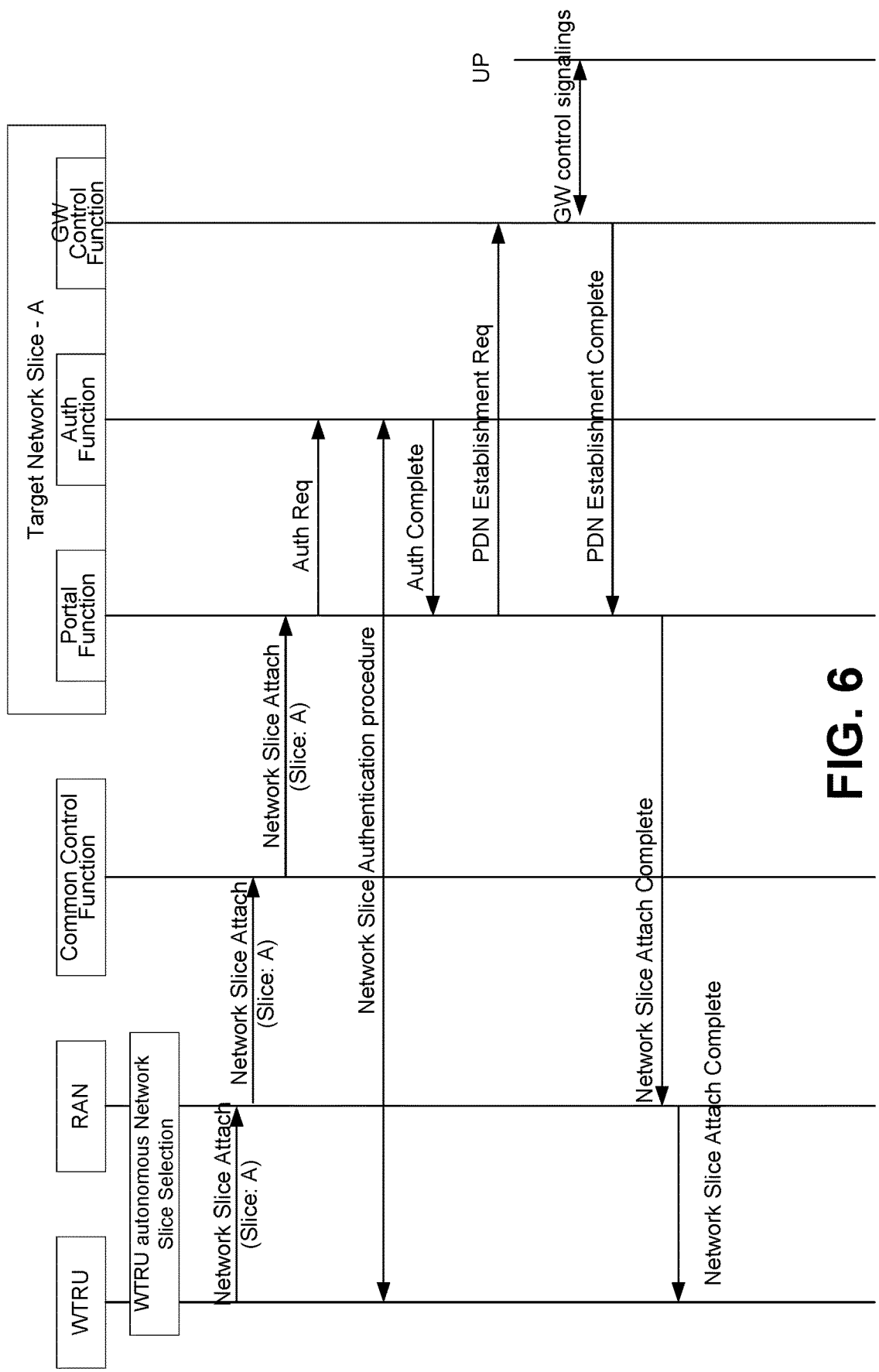
FIG. 6 depicts a diagram illustrating an example initial network slice connection.

FIG. 6 is a diagram illustrating an example initial network slice connection. If the WTRU autonomously selects the network slice, the WTRU may explicitly initiate Attach or PDN connection procedure towards the selected network slice. The WTRU may directly include the identifier of the selected network slice or the service name (e.g., akin to APN), which can be mapped to a target network slice, in the Attach or PDN connection request. The initial Attach or PDN connection procedure may be handled by the control function in the selected network slice. There may be a "Portal Function" in each network slice which handles the initial connection request from the WTRUs. The "Portal Function" may have the capability to download the user subscription profile from the central database, and may invoke other necessary control functions in the same network slice to complete the connection procedure.

There may be different ways that such messages may be forwarded to the portal function of the target network slice. For example, the RAN may have the capability to ascertain the target network slice of such messages, either by parsing the network slice identifier or service name in the messages, or the selected network slice had been stored in the RAN's WTRU context in the previous signaling. The RAN may be configured with the address of the portal function of each network slice so the RAN is able to forward the message to the portal function of the target network slice. For example, the message may be invariably forwarded by the RAN to a common control function that may be independent of network slices, and the common control function may have the capability to analyze the target network slice and forward it to the portal function in the target network slice. For example, the message may be invariably forwarded by the RAN to the common control function or the portal function in a default network slice. The common control function or the portal function in the default network slice may analyze the real target network slice and instruct the RAN to redirect it to the portal function in the target network slice.

Upon receiving the initial attach or PDN connection request, the handling control function may initiate interaction with other network functions to complete the connection. For example, the portal function may invoke one or more of the following: the network-slice-specific authentication function to perform additional authentication on the WTRU (the WTRU may have been generally authenticated when it accesses the RAN and the network); the gateway control function in the same slice to establish the initial PDN connection (e.g. default bearer) for the WTRU; and/or the QoS control function to install the QoS profile for the connection.

Network slice connection may be proxied by the same common control function. Network slice connection may happen directly between the WTRU and the network slice. Interactions between the WTRU and the network functions in the network slice may be through the portal function, for example, the messages from the WTRU to a particular network function (such as, e.g., Auth Function) may be forwarded by RAN to the portal function. The portal function may forward them to the proper function that will handle the messages. For example, messages to the WTRU from the various network functions inside the network slice may go to the portal function. The portal function may forward the messages to the RAN and WTRU. The RAN may need to store the address of the portal function of the network slice.

Figure 7:
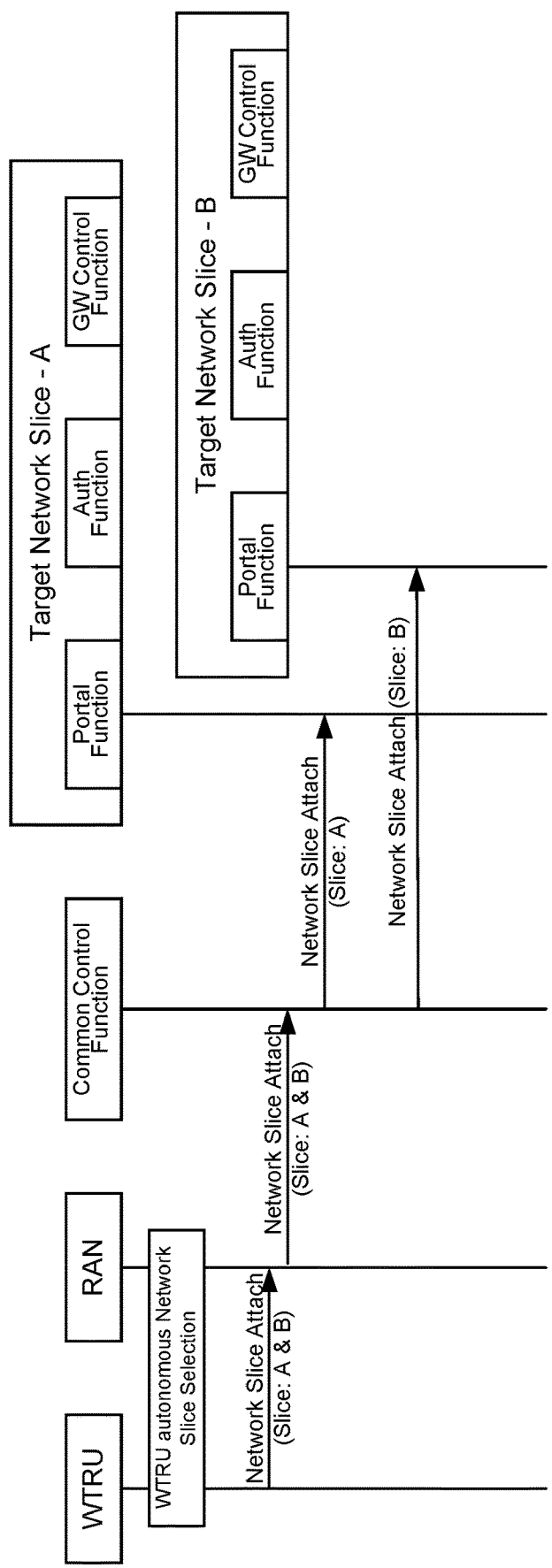
FIG. 7 depicts a diagram illustrating an example multiple network slice connection forking.

FIG. 7 is a diagram illustrating multiple network slice connection forking. The WTRU may be (e.g., initially) connected to multiple network slices. The WTRU may decide to connect to multiple network slices based on the configuration on the device, the network policy of the network slice selection, etc. The WTRU may sequentially initiate the single connection to each selected network slice using a procedure described herein. Each connection request (initial attach or PDN connection request) may contain a single slice identifier or service name. The WTRU may include multiple network slice identifiers or service names in a single initial connection request and send it to a common control function. The common control function may "fork" multiple individual connection requests to the multiple target network slices.

Figure 8A:
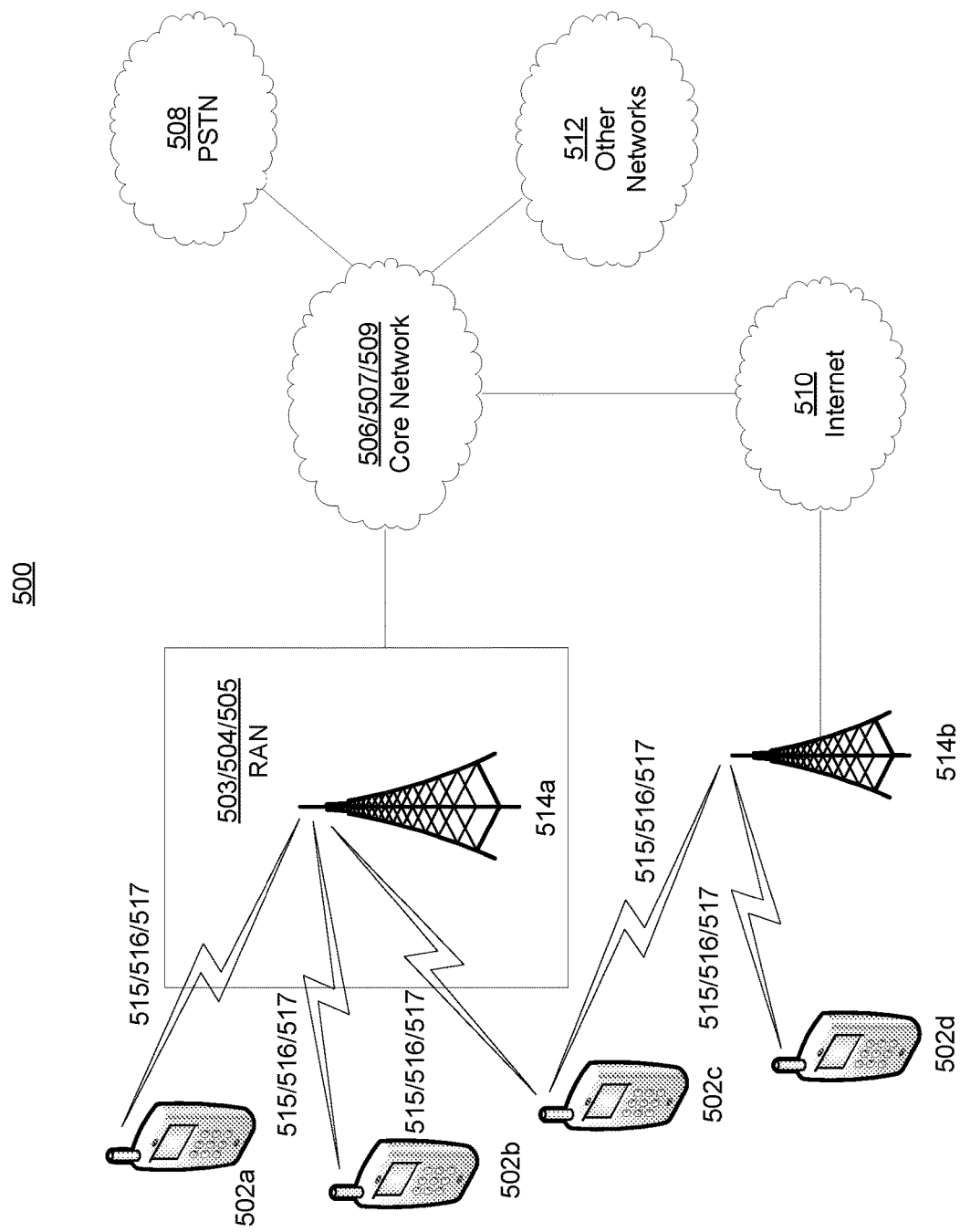
FIG. 8A depicts a diagram of an example communications system in which one or more disclosed embodiments may be implemented.

FIG. 8A is a diagram of an example communications system 500 in which one or more examples disclosed herein may be implemented. The communications system 500 may be a multiple access system that provides content, such as voice, data, video, messaging, broadcast, etc., to multiple wireless users. The communications system 500 may enable multiple wireless users to access such content through the sharing of system resources, including wireless bandwidth. For example, the communications systems 500 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 8A, the communications system 500 may include wireless transmit/receive units (WTRUs) 502a, 502b, 502c, and/or 502d (which generally or collectively may be referred to as WTRU 502), a radio access network (RAN) 503/504/505, a core network 506/507/509, a public switched telephone network (PSTN) 508, the Internet 510, and other networks 512, though it will be appreciated that the disclosed embodiments contemplate any number of WTRUs, base stations, networks, and/or network elements. Each of the WTRUs 502a, 502b, 502c, and/or 502d may be any type of device configured to operate and/or communicate in a wireless environment. By way of example, the WTRUs 502a, 502b, 502c, and/or 502d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 500 may also include a base station 514a and a base station 514b. Each of the base stations 514a, 514b may be any type of device configured to wirelessly interface with at least one of the WTRUs 502a, 502b, 502c, and/or 502d to facilitate access to one or more communication networks, such as the core network 506/507/509, the Internet 510, and/or the networks 512. By way of example, the base stations 514a and/or 514b may be a base transceiver station (BTS), a Node-B, an eNode B, a Home Node B, a Home eNode B, a site controller, an access point (AP), a wireless router, and the like. While the base stations 514a, 514b are each depicted as a single element, it will be appreciated that the base stations 514a, 514b may include any number of interconnected base stations and/or network elements.

The base station 514a may be part of the RAN 503/504/505, which may also include other base stations and/or network elements (not shown), such as a base station controller (BSC), a radio network controller (RNC), relay nodes, etc. The base station 514a and/or the base station 514b may be configured to transmit and/or receive wireless signals within a particular geographic region, which may be referred to as a cell (not shown). The cell may further be divided into cell sectors. For example, the cell associated with the base station 514a may be divided into three sectors. Thus, in one embodiment, the base station 514a may include three transceivers, i.e., one for each sector of the cell. In another embodiment, the base station 514a may employ multiple-input multiple output (MIMO) technology and, therefore, may utilize multiple transceivers for each sector of the cell.

The base stations 514a and/or 514b may communicate with one or more of the WTRUs 502a, 502b, 502c, and/or 502d over an air interface 515/516/517, which may be any suitable wireless communication link (e.g., radio frequency (RF), microwave, infrared (IR), ultraviolet (UV), visible light, etc.). The air interface 515/516/517 may be established using any suitable radio access technology (RAT).

More specifically, as noted above, the communications system 500 may be a multiple access system and may employ one or more channel access schemes, such as CDMA, TDMA, FDMA, OFDMA, SC-FDMA, and the like. For example, the base station 514a in the RAN 503/504/505 and the WTRUs 502a, 502b, and/or 502c may implement a radio technology such as Universal Mobile Telecommunications System (UMTS) Terrestrial Radio Access (UTRA), which may establish the air interface 515/516/517 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 514a and the WTRUs 502a, 502b, and/or 502c may implement a radio technology such as Evolved UMTS Terrestrial Radio Access (E-UTRA), which may establish the air interface 515/516/517 using Long Term Evolution (LTE) and/or LTE-Advanced (LTE-A).

In other embodiments, the base station 514a and the WTRUs 502a, 502b, and/or 502c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 514b in FIG. 8A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 514b and the WTRUs 502c, 502d may implement a radio technology such as IEEE 802.11 to establish a wireless local area network (WLAN). In another embodiment, the base station 514b and the WTRUs 502c, 502d may implement a radio technology such as IEEE 802.15 to establish a wireless personal area network (WPAN). In yet another embodiment, the base station 514b and the WTRUs 502c, 502d may utilize a cellular-based RAT (e.g., WCDMA, CDMA2000, GSM, LTE, LTE-A, etc.) to establish a picocell or femtocell. As shown in FIG. 8A, the base station 514b may have a direct connection to the Internet 510. Thus, the base station 514b may not be required to access the Internet 510 via the core network 506/507/509.

The RAN 503/504/505 may be in communication with the core network 506/507/509, which may be any type of network configured to provide voice, data, applications, and/or voice over internet protocol (VoIP) services to one or more of the WTRUs 502a, 502b, 502c, and/or 502d. For example, the core network 506/507/509 may provide call control, billing services, mobile location-based services, pre-paid calling, Internet connectivity, video distribution, etc., and/or perform high-level security functions, such as user authentication. Although not shown in FIG. 8A, it will be appreciated that the RAN 503/504/505 and/or the core network 506/507/509 may be in direct or indirect communication with other RANs that employ the same RAT as the RAN 503/504/505 or a different RAT. For example, in addition to being connected to the RAN 503/504/505, which may be utilizing an E-UTRA radio technology, the core network 506/507/509 may also be in communication with another RAN (not shown) employing a GSM radio technology.

The core network 506/507/509 may also serve as a gateway for the WTRUs 502a, 502b, 502c, and/or 502d to access the PSTN 508, the Internet 510, and/or other networks 512. The PSTN 508 may include circuit-switched telephone networks that provide plain old telephone service (POTS). The Internet 510 may include a global system of interconnected computer networks and devices that use common communication protocols, such as the transmission control protocol (TCP), user datagram protocol (UDP) and the internet protocol (IP) in the TCP/IP internet protocol suite. The networks 512 may include wired or wireless communications networks owned and/or operated by other service providers. For example, the networks 512 may include another core network connected to one or more RANs, which may employ the same RAT as the RAN 503/504/505 or a different RAT.

Some or all of the WTRUs 502a, 502b, 502c, and/or 502d in the communications system 500 may include multi-mode capabilities, i.e., the WTRUs 502a, 502b, 502c, and/or 502d may include multiple transceivers for communicating with different wireless networks over different wireless links. For example, the WTRU 502c shown in FIG. 8A may be configured to communicate with the base station 514a, which may employ a cellular-based radio technology, and with the base station 514b, which may employ an IEEE 802 radio technology.

Figure 8B:
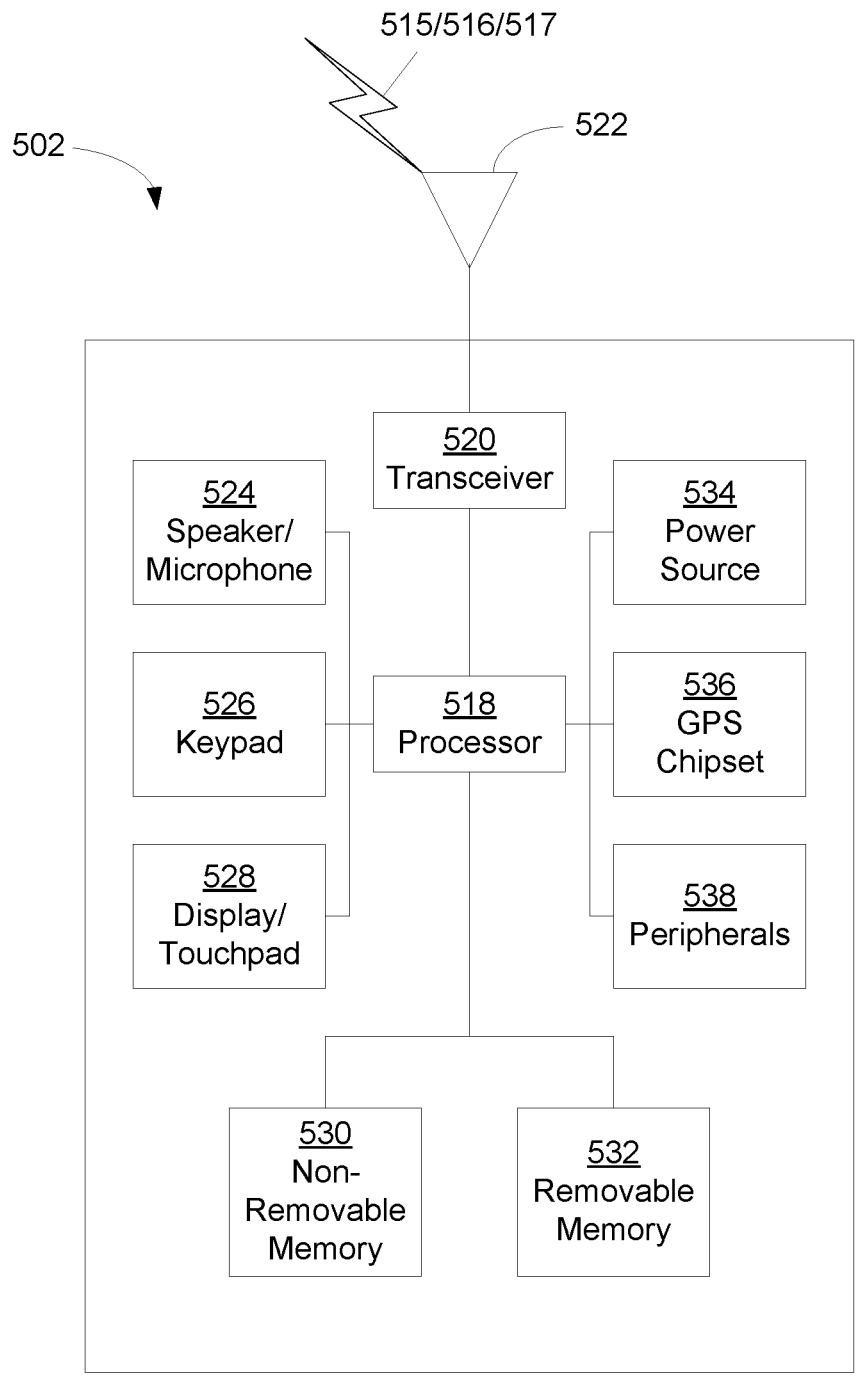
FIG. 8B depicts a diagram of an example WTRU that may be used within the communications system illustrated in FIG. 8A.

FIG. 8B depicts a system diagram of an example WTRU 502. As shown in FIG. 8B, the WTRU 502 may include a processor 518, a transceiver 520, a transmit/receive element 522, a speaker/microphone 524, a keypad 526, a display/touchpad 528, non-removable memory 530, removable memory 532, a power source 534, a global positioning system (GPS) chipset 536, and other peripherals 138. It will be appreciated that the WTRU 502 may include any sub-combination of the foregoing elements while remaining consistent with an embodiment. Also, embodiments contemplate that the base stations 514a and 514b, and/or the nodes that base stations 514a and 514b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 8B and described herein.

The processor 518 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 518 may perform signal coding, data processing, power control, input/output processing, and/or any other functionality that enables the WTRU 502 to operate in a wireless environment. The processor 518 may be coupled to the transceiver 520, which may be coupled to the transmit/receive element 522. While FIG. 8B depicts the processor 518 and the transceiver 520 as separate components, it may be appreciated that the processor 518 and the transceiver 520 may be integrated together in an electronic package or chip.

The transmit/receive element 522 may be configured to transmit signals to, or receive signals from, a base station (e.g., the base station 514a) over the air interface 515/516/517. For example, in one embodiment, the transmit/receive element 522 may be an antenna configured to transmit and/or receive RF signals. In another embodiment, the transmit/receive element 522 may be an emitter/detector configured to transmit and/or receive IR, UV, or visible light signals, for example. In yet another embodiment, the transmit/receive element 522 may be configured to transmit and receive both RF and light signals. It will be appreciated that the transmit/receive element 522 may be configured to transmit and/or receive any combination of wireless signals.

In addition, although the transmit/receive element 522 is depicted in FIG. 8B as a single element, the WTRU 502 may include any number of transmit/receive elements 522. More specifically, the WTRU 502 may employ MIMO technology. Thus, in one embodiment, the WTRU 502 may include two or more transmit/receive elements 522 (e.g., multiple antennas) for transmitting and receiving wireless signals over the air interface 515/516/517.

The transceiver 520 may be configured to modulate the signals that are to be transmitted by the transmit/receive element 522 and to demodulate the signals that are received by the transmit/receive element 522. As noted above, the WTRU 502 may have multi-mode capabilities. Thus, the transceiver 520 may include multiple transceivers for enabling the WTRU 502 to communicate via multiple RATs, such as UTRA and IEEE 802.11, for example.

The processor 518 of the WTRU 502 may be coupled to, and may receive user input data from, the speaker/microphone 524, the keypad 526, and/or the display/touchpad 528 (e.g., a liquid crystal display (LCD) display unit or organic light-emitting diode (OLED) display unit). The processor 518 may also output user data to the speaker/microphone 524, the keypad 526, and/or the display/touchpad 528. In addition, the processor 518 may access information from, and store data in, any type of suitable memory, such as the non-removable memory 530 and/or the removable memory 532. The non-removable memory 530 may include random-access memory (RAM), read-only memory (ROM), a hard disk, or any other type of memory storage device. The removable memory 532 may include a subscriber identity module (SIM) card, a memory stick, a secure digital (SD) memory card, and the like. In other embodiments, the processor 518 may access information from, and store data in, memory that is not physically located on the WTRU 502, such as on a server or a home computer (not shown).

The processor 518 may receive power from the power source 534, and may be configured to distribute and/or control the power to the other components in the WTRU 502. The power source 534 may be any suitable device for powering the WTRU 502. For example, the power source 534 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 518 may also be coupled to the GPS chipset 536, which may be configured to provide location information (e.g., longitude and latitude) regarding the current location of the WTRU 502. In addition to, or in lieu of, the information from the GPS chipset 536, the WTRU 502 may receive location information over the air interface 515/516/517 from a base station (e.g., base stations 514a, 514b) and/or determine its location based on the timing of the signals being received from two or more nearby base stations. It will be appreciated that the WTRU 502 may acquire location information by way of any suitable location-determination method while remaining consistent with an embodiment.

The processor 518 may further be coupled to other peripherals 538, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8C:
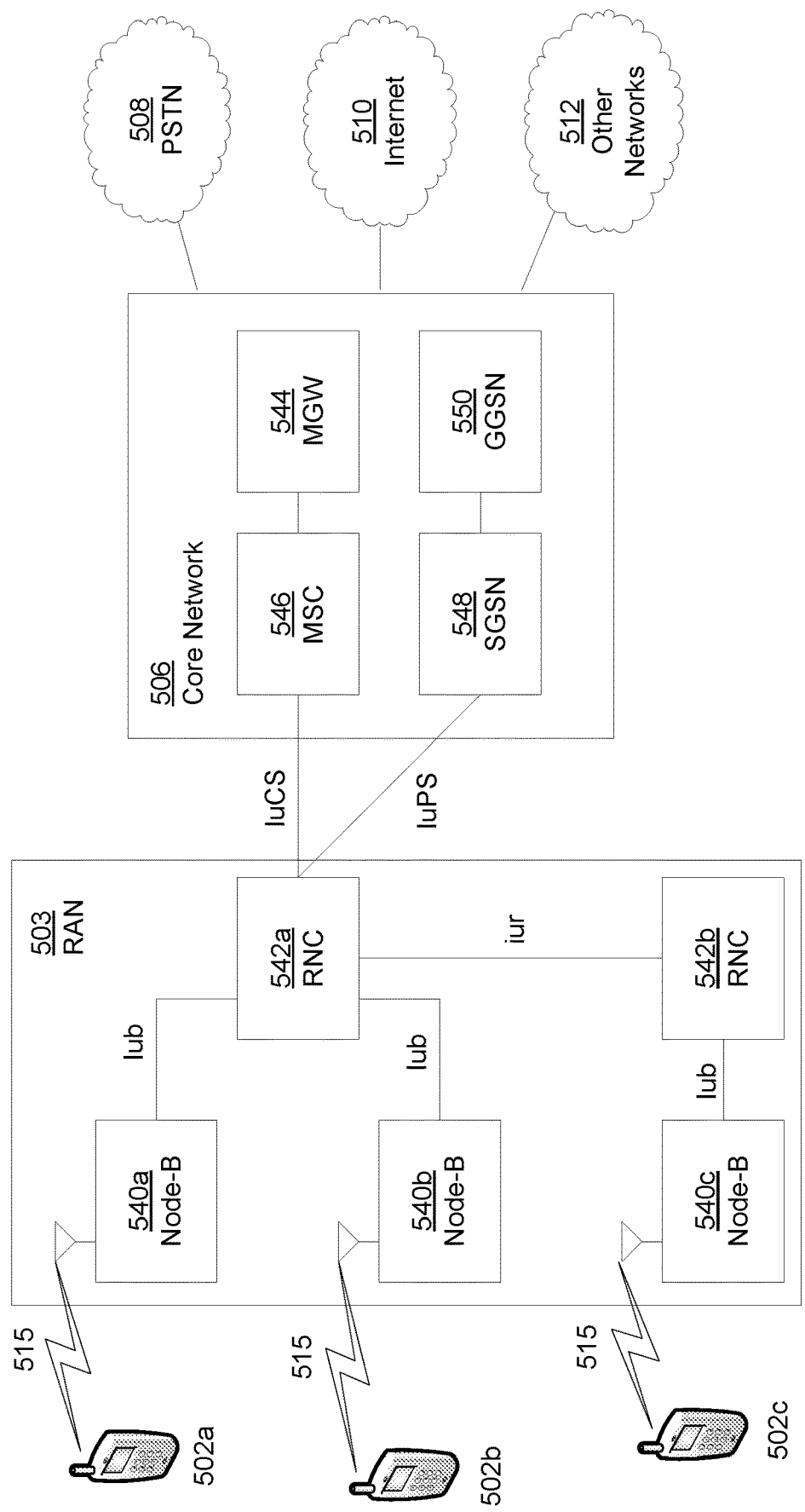
FIG. 8C depicts a diagram of an example radio access network (RAN) and an example core network that may be used within the communications system illustrated in FIG. 8A.

FIG. 8C depicts a system diagram of the RAN 503 and the core network 506 according to an embodiment. As noted above, the RAN 503 may employ a UTRA radio technology to communicate with the WTRUs 502a, 502b, and/or 502c over the air interface 515. The RAN 503 may also be in communication with the core network 506. As shown in FIG. 8C, the RAN 503 may include Node-Bs 540a, 540b, and/or 540c, which may each include one or more transceivers for communicating with the WTRUs 502a, 502b, and/or 502c over the air interface 515. The Node-Bs 540a, 540b, and/or 540c may each be associated with a particular cell (not shown) within the RAN 503. The RAN 503 may also include RNCs 542a and/or 542b. It will be appreciated that the RAN 503 may include any number of Node-Bs and RNCs while remaining consistent with an embodiment.

As shown in FIG. 8C, the Node-Bs 540a and/or 540b may be in communication with the RNC 542a. Additionally, the Node-B 540c may be in communication with the RNC 542b.

The Node-Bs 540a, 540b, and/or 540c may communicate with the respective RNCs 542a, 542b via an Iub interface. The RNCs 542a, 542b may be in communication with one another via an Iur interface. Each of the RNCs 542a, 542b may be configured to control the respective Node-Bs 540a, 540b, and/or 540c to which it is connected. In addition, each of the RNCs 542a, 542b may be configured to carry out or support other functionality, such as outer loop power control, load control, admission control, packet scheduling, handover control, macrodiversity, security functions, data encryption, and the like.

The core network 506 shown in FIG. 8C may include a media gateway (MGW) 544, a mobile switching center (MSC) 546, a serving GPRS support node (SGSN) 548, and/or a gateway GPRS support node (GGSN) 550. While each of the foregoing elements are depicted as part of the core network 506, it will be appreciated that any one of these elements may be owned and/or operated by an entity other than the core network operator.

The RNC 542a in the RAN 503 may be connected to the MSC 546 in the core network 506 via an IuCS interface. The MSC 546 may be connected to the MGW 544. The MSC 546 and the MGW 544 may provide the WTRUs 502a, 502b, and/or 502c with access to circuit-switched networks, such as the PSTN 508, to facilitate communications between the WTRUs 502a, 502b, and/or 502c and traditional land-line communications devices.

The RNC 542a in the RAN 503 may also be connected to the SGSN 548 in the core network 506 via an IuPS interface. The SGSN 548 may be connected to the GGSN 550. The SGSN 548 and the GGSN 550 may provide the WTRUs 502a, 502b, and/or 502c with access to packet-switched networks, such as the Internet 510, to facilitate communications between and the WTRUs 502a, 502b, and/or 502c and IP-enabled devices.

As noted above, the core network 506 may also be connected to the networks 512, which may include other wired or wireless networks that are owned and/or operated by other service providers.

Figure 8D:
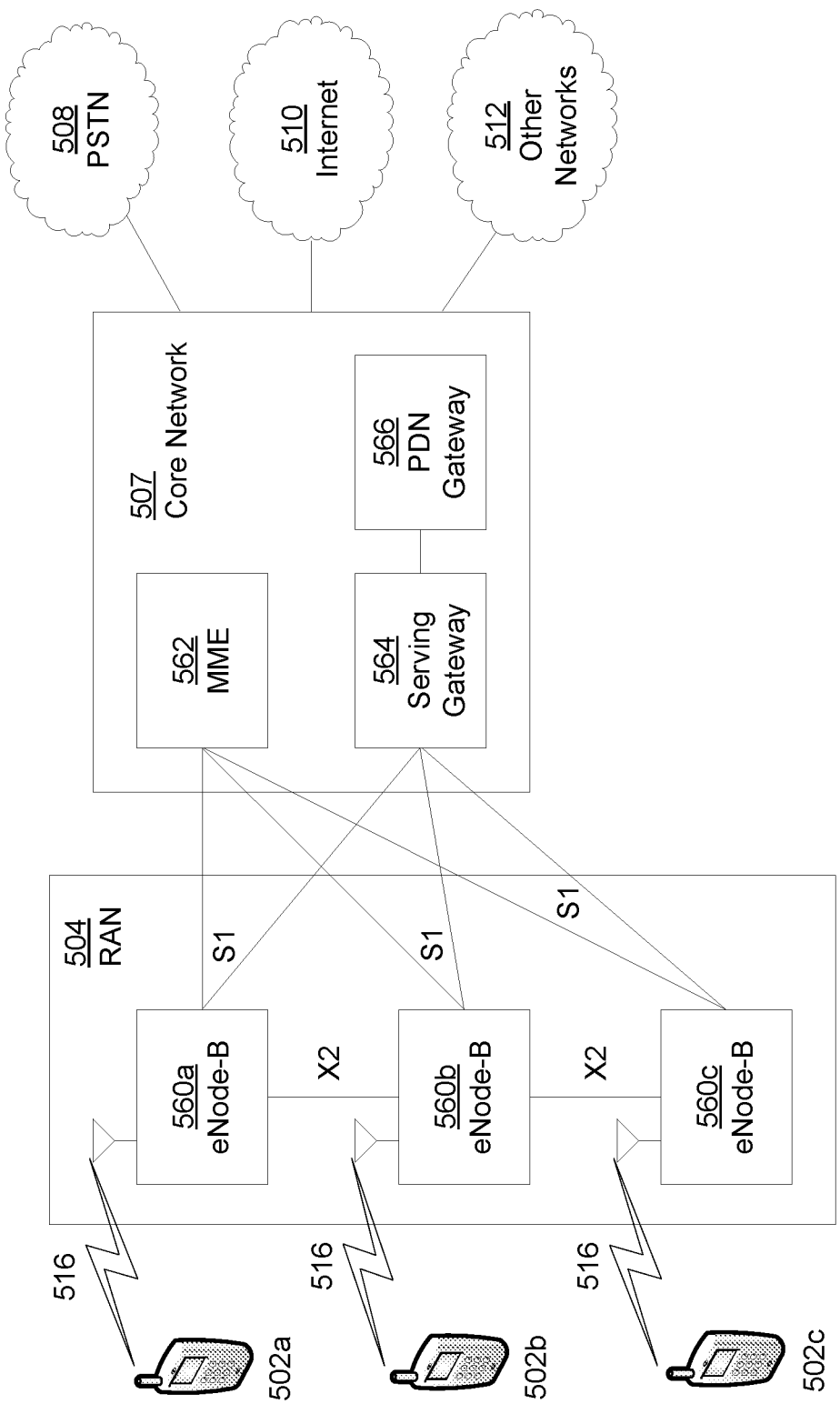
FIG. 8D depicts a diagram of another example RAN and an example core network that may be used within the communications system illustrated in FIG. 8A.

FIG. 8D depicts a system diagram of the RAN 504 and the core network 507 according to an embodiment. As noted above, the RAN 504 may employ an E-UTRA radio technology to communicate with the WTRUs 502a, 502b, and/or 502c over the air interface 516. The RAN 504 may also be in communication with the core network 507.

The RAN 504 may include eNode-Bs 560a, 560b, and/or 560c, though it will be appreciated that the RAN 504 may include any number of eNode-Bs while remaining consistent with an embodiment. The eNode-Bs 560a, 560b, and/or 560c may each include one or more transceivers for communicating with the WTRUs 502a, 502b, and/or 502c over the air interface 516. In one embodiment, the eNode-Bs 560a, 560b, and/or 560c may implement MIMO technology. Thus, the eNode-B 560a, for example, may use multiple antennas to transmit wireless signals to, and receive wireless signals from, the WTRU 502a.

Each of the eNode-Bs 560a, 560b, and/or 560c may be associated with a particular cell (not shown) and may be configured to handle radio resource management decisions, handover decisions, scheduling of users in the uplink and/or downlink, and the like. As shown in FIG. 8D, the eNode-Bs 560a, 560b, and/or 560c may communicate with one another over an X2 interface.

The core network 507 shown in FIG. 8D may include a mobility management gateway (MME) 562, a serving gateway 564, and a packet data network (PDN) gateway 566. While each of the foregoing elements are depicted as part of the core network 507, it will be appreciated that any one of these elements may be owned and/or operated by an entity other than the core network operator.

The MME 562 may be connected to each of the eNode-Bs 560a, 560b, and/or 560c in the RAN 504 via an S1 interface and may serve as a control node. For example, the MME 562 may be responsible for authenticating users of the WTRUs 502a, 502b, and/or 502c, bearer activation/deactivation, selecting a particular serving gateway during an initial attach of the WTRUs 502a, 502b, and/or 502c, and the like. The MME 562 may also provide a control plane function for switching between the RAN 504 and other RANs (not shown) that employ other radio technologies, such as GSM or WCDMA.

The serving gateway 564 may be connected to each of the eNode-Bs 560a, 560b, and/or 560c in the RAN 504 via the S1 interface. The serving gateway 564 may generally route and forward user data packets to/from the WTRUs 502a, 502b, and/or 502c. The serving gateway 564 may also perform other functions, such as anchoring user planes during inter-eNode B handovers, triggering paging when downlink data is available for the WTRUs 502a, 502b, and/or 502c, managing and storing contexts of the WTRUs 502a, 502b, and/or 502c, and the like.

The serving gateway 564 may also be connected to the PDN gateway 566, which may provide the WTRUs 502a, 502b, and/or 502c with access to packet-switched networks, such as the Internet 510, to facilitate communications between the WTRUs 502a, 502b, and/or 502c and IP-enabled devices.

The core network 507 may facilitate communications with other networks. For example, the core network 507 may provide the WTRUs 502a, 502b, and/or 502c with access to circuit-switched networks, such as the PSTN 508, to facilitate communications between the WTRUs 502a, 502b, and/or 502c and traditional land-line communications devices. For example, the core network 507 may include, or may communicate with, an IP gateway (e.g., an IP multimedia subsystem (IMS) server) that serves as an interface between the core network 507 and the PSTN 508. In addition, the core network 507 may provide the WTRUs 502a, 502b, and/or 502c with access to the networks 512, which may include other wired or wireless networks that are owned and/or operated by other service providers.

Figure 8E:
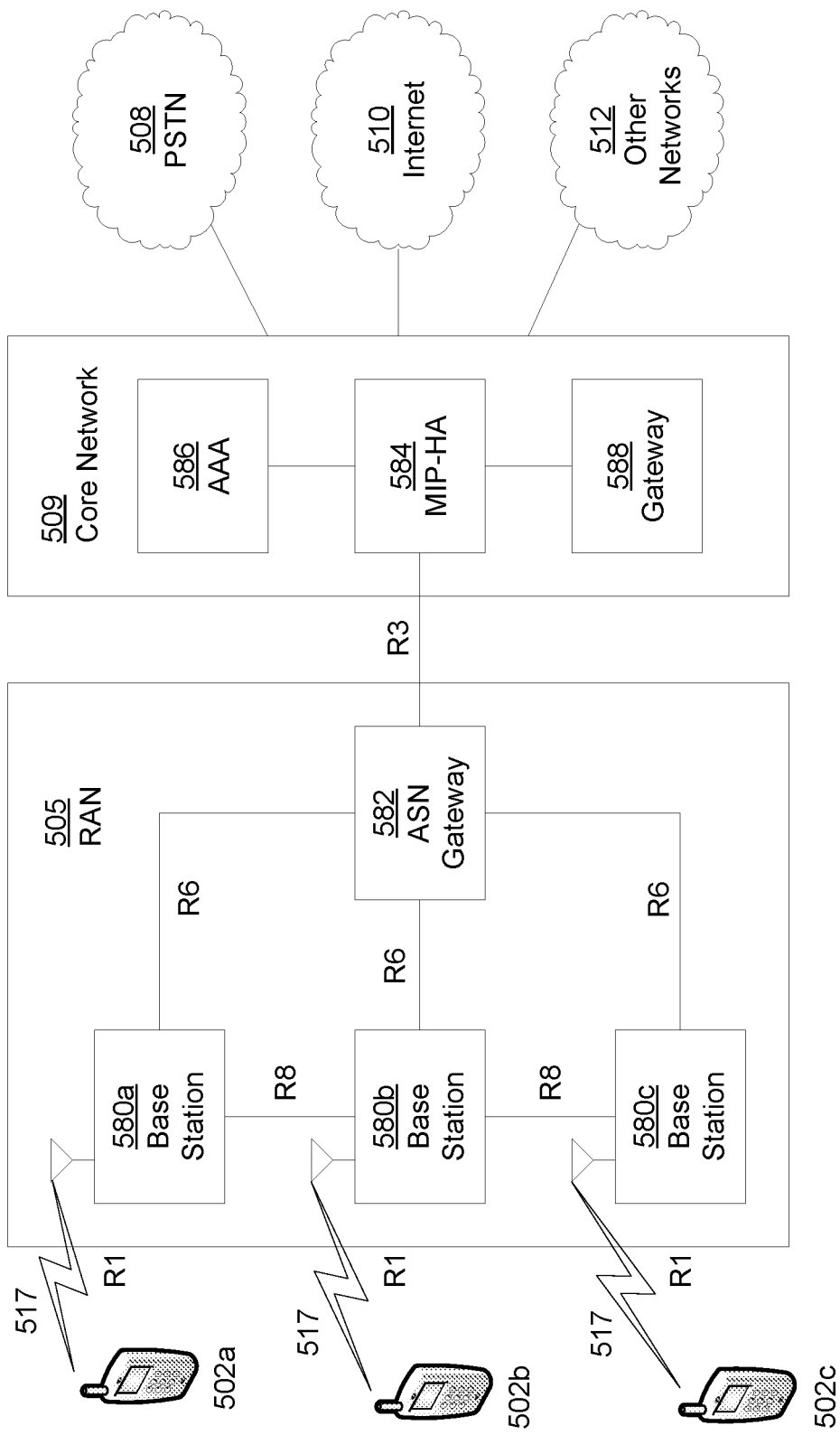
FIG. 8E depicts a diagram of another example RAN and an example core network that may be used within the communications system illustrated in FIG. 8A.

FIG. 8E depicts a system diagram of the RAN 505 and the core network 509 according to an embodiment. The RAN 505 may be an access service network (ASN) that employs IEEE 802.16 radio technology to communicate with the WTRUs 502a, 502b, and/or 502c over the air interface 517. As will be further discussed below, the communication links between the different functional entities of the WTRUs 502a, 502b, and/or 502c, the RAN 505, and the core network 509 may be defined as reference points.

As shown in FIG. 8E, the RAN 505 may include base stations 580a, 580b, and/or 580c, and an ASN gateway 582, though it will be appreciated that the RAN 505 may include any number of base stations and ASN gateways while remaining consistent with an embodiment. The base stations 580a, 580b, and/or 580c may each be associated with a particular cell (not shown) in the RAN 505 and may each include one or more transceivers for communicating with the WTRUs 502a, 502b, and/or 502c over the air interface 517. In one embodiment, the base stations 580a, 580b, and/or 580c may implement MIMO technology. Thus, the base station 580a, for example, may use multiple antennas to transmit wireless signals to, and receive wireless signals from, the WTRU 502a. The base stations 580a, 580b, and/or 580c may also provide mobility management functions, such as handoff triggering, tunnel establishment, radio resource management, traffic classification, quality of service (QoS) policy enforcement, and the like. The ASN gateway 582 may serve as a traffic aggregation point and may be responsible for paging, caching of subscriber profiles, routing to the core network 509, and the like.

The air interface 517 between the WTRUs 502a, 502b, and/or 502c and the RAN 505 may be defined as an R1 reference point that implements the IEEE 802.16 specification. In addition, each of the WTRUs 502a, 502b, and/or 502c may establish a logical interface (not shown) with the core network 509. The logical interface between the WTRUs 502a, 502b, and/or 502c and the core network 509 may be defined as an R2 reference point, which may be used for authentication, authorization, IP host configuration management, and/or mobility management.

The communication link between each of the base stations 580a, 580b, and/or 580c may be defined as an R8 reference point that includes protocols for facilitating WTRU handovers and the transfer of data between base stations. The communication link between the base stations 580a, 580b, and/or 580c and the ASN gateway 582 may be defined as an R6 reference point. The R6 reference point may include protocols for facilitating mobility management based on mobility events associated with each of the WTRUs 502a, 502b, and/or 502c.

As shown in FIG. 8E, the RAN 505 may be connected to the core network 509. The communication link between the RAN 505 and the core network 509 may defined as an R3 reference point that includes protocols for facilitating data transfer and mobility management capabilities, for example. The core network 509 may include a mobile IP home agent (MIP-HA) 584, an authentication, authorization, accounting (AAA) server 586, and a gateway 588. While each of the foregoing elements are depicted as part of the core network 509, it will be appreciated that any one of these elements may be owned and/or operated by an entity other than the core network operator.

The MIP-HA may be responsible for IP address management, and may enable the WTRUs 502a, 502b, and/or 502c to roam between different ASNs and/or different core networks. The MIP-HA 584 may provide the WTRUs 502a, 502b, and/or 502c with access to packet-switched networks, such as the Internet 510, to facilitate communications between the WTRUs 502a, 502b, and/or 502c and IP-enabled devices. The AAA server 586 may be responsible for user authentication and for supporting user services. The gateway 588 may facilitate interworking with other networks. For example, the gateway 588 may provide the WTRUs 502a, 502b, and/or 502c with access to circuit-switched networks, such as the PSTN 508, to facilitate communications between the WTRUs 502a, 502b, and/or 502c and traditional land-line communications devices. In addition, the gateway 588 may provide the WTRUs 502a, 502b, and/or 502c with access to the networks 512, which may include other wired or wireless networks that are owned and/or operated by other service providers.

Although not shown in FIG. 8E, the RAN 505 may be connected to other ASNs and the core network 509 may be connected to other core networks. The communication link between the RAN 505 the other ASNs may be defined as an R4 reference point, which may include protocols for coordinating the mobility of the WTRUs 502a, 502b, and/or 502c between the RAN 505 and the other ASNs. The communication link between the core network 509 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a network control node for connecting a wireless transmit/receive unit (WTRU) to a network slice, the method comprising:
   the network control node receiving service information associated with a service being requested by the WTRU;
   the network control node determining, based on subscription information for the WTRU and the received service information, slice information associated with the network slice, wherein the slice information comprises an identifier of the network slice or a service class served by the network slice; and
   the network control node determining whether the network control node or another network control node is to service the WTRU for accessing the network slice, wherein:
      on a condition that the network control node determines that the network control node is to service the WTRU for accessing the network slice, the network control node providing the slice information associated with the network slice to the WTRU, and
      on a condition that the network control node determines that another network control node is to service the WTRU for accessing the network slice, the network control node sending a request to a second network control node or a third network control node, wherein, if the request is sent to the second network control node, the request indicates that the second network control node is to service the WTRU for accessing the network slice, and wherein, if the request is sent to the third network control node, the request includes information for the third network control node to select the another network control node to service the WTRU for accessing the network slice.

2. The method of claim 1, wherein the service information is received based on a network slice selection policy configured for the WTRU.

3. The method of claim 1, wherein the service information is received via a non-access stratum (NAS) message.

4. The method of claim 3, wherein the request sent to the second network control node includes at least part of the NAS message.

5. The method of claim 3, wherein the NAS message is a part of a registration request by the WTRU.

6. The method of claim 1, wherein the service information indicates one or more of an application quality of service (QoS) requirement, an application type, or a mobility characteristic of the WTRU.

7. The method of claim 1, wherein the subscription information is retrieved by the network control node from another network entity.

8. The method of claim 1, wherein the network control node determining whether the network control node or another network control node is to service the WTRU for accessing the network slice comprises the network control node determining whether the network slice is among a set of allowed network slices for the WTRU.

9. The method of claim 1, further comprising the network control node retrieving, from another network entity, access information regarding the second network control node.

10. The method of claim 1, wherein the third network control node comprises a radio access network (RAN) entity.

11. A network control node configured to connect a wireless transmit/receive unit (WTRU) to a network slice, the network control node comprising:
a processor configured to:
receive service information associated with a service being requested by the WTRU;
determine, based on subscription information for the WTRU and the received service information, slice information associated with the network slice, wherein the slice information comprises an identifier of the network slice, or a service class served by the network slice; and
determine whether the network control node or another network control node is to service the WTRU for accessing the network slice, wherein:
based on a determination that the network control node is to service the WTRU for accessing the network shoe, the processor is configured to provide the slice information associated with the network slice to the WTRU, and
based on a determination that another network control node is to service the WTRU for accessing the network slice, the processor is configured to send a request to a second network control node or a third network control node, wherein, if the request is sent to the second network control node, the request indicates that the second network control node is to service the WTRU for accessing the network slice, and wherein, if the request is sent to the third network control node, the request includes information for the third network control node to select the another network control node to service the WTRU for accessing the network slice.

12. The network control node of claim 11, wherein the service information is received based on a network slice selection policy configured for the WTRU.

13. The network control node of claim 11, wherein the service information is received via a non-access stratum (NAS) message.

14. The network control node of claim 13, wherein the request sent to the second network control node comprises at least a part of the NAS message.

15. The network control node of claim 13, wherein the NAS message is a part of a registration request by the WTRU.

16. The network control node of claim 11, wherein the service information indicates one or more of an application quality of service (QoS) requirement, an application type, or a mobility characteristic of the WTRU.

17. The network control node of claim 11, wherein the subscription information is retrieved by the network control node from another network entity.

18. The network control node of claim 11, wherein the processor being configured to determine whether the network control node or the another network control node is to service the WTRU for accessing the network slice comprises the processor being configured to determine whether the network slice is among a set of allowed network slices for the WTRU.

19. The network control node of claim 11, wherein the processor is further configured to retrieve, from another network entity, access information regarding the second network control node.

20. The network control node of claim 11, wherein the third network control node comprises a radio access network (RAN) entity.

* * * * *